(12) United States Patent
Yoshida et al.

(10) Patent No.: US 12,443,068 B2
(45) Date of Patent: Oct. 14, 2025

(54) DISPLAY DEVICE

(71) Applicant: Sharp Display Technology Corporation, Kameyama (JP)

(72) Inventors: Keisuke Yoshida, Kameyama (JP); Satoshi Ueda, Kameyama (JP); Katsunori Misaki, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/431,008

(22) Filed: Feb. 2, 2024

(65) Prior Publication Data
US 2024/0295769 A1    Sep. 5, 2024

(30) Foreign Application Priority Data
Mar. 2, 2023    (JP) .................................. 2023-031520

(51) Int. Cl.
*G02F 1/1335*    (2006.01)
(52) U.S. Cl.
CPC .. *G02F 1/133512* (2013.01); *G02F 1/133514* (2013.01)
(58) Field of Classification Search
None
See application file for complete search history.

(56) References Cited

U.S. PATENT DOCUMENTS

| 2009/0323005 | A1* | 12/2009 | Ota ..................... G02F 1/13439 349/143 |
| 2017/0090262 | A1 | 3/2017 | Itou et al. |
| 2017/0168204 | A1* | 6/2017 | Zhang ............... G02F 1/133617 |
| 2018/0157098 | A1* | 6/2018 | Choung ............ G02F 1/133621 |
| 2020/0201095 | A1* | 6/2020 | Chikama ............... G06F 1/3262 |

FOREIGN PATENT DOCUMENTS

JP    2017068016 A    4/2017

* cited by examiner

*Primary Examiner* — Shan Liu
(74) *Attorney, Agent, or Firm* — ScienBiziP, P.C.

(57) ABSTRACT

A display device includes a first color filter, a second color filter, a first pixel electrode, a second pixel electrode, a common electrode, an insulating film, and a light blocking part that is disposed at a boundary between the first color filter and the second color filter. The light blocking part includes a light blocking film, a first transmission film disposed on the upper layer side of the light blocking film, and a reflection/transmission film disposed on the upper layer side of the first transmission film, the light blocking film has a light transmittance lower than light transmittances of the first transmission film and the reflection/transmission film, the first transmission film has the light transmittance higher than that of the reflection/transmission film, and the reflection/transmission film has a light reflectance higher than that of the first transmission film and lower than that of the light blocking film.

8 Claims, 12 Drawing Sheets

DISPLAY DEVICE

BACKGROUND

1. Field

The present disclosure relates to a display device.

2. Description of the Related Art

In the related art, as an example of a display device, a liquid crystal display device described in Japanese Unexamined Patent Application Publication No. 2017-68016 is known. The liquid crystal display device described in Japanese Unexamined Patent Application Publication No. 2017-68016 includes: a first substrate that includes a scanning signal line, a video signal line, a first electrode, a color filter, a common wiring that is in contact with the first electrode along the video signal line, a reflection suppressing layer that is located on the common wiring, a transparent layer that is located on the reflection suppressing layer, and a second electrode; a liquid crystal layer that is located on the first substrate; and a second substrate that is located on the liquid crystal layer, in which a film thickness of the transparent layer is 10 nm or more and 40 nm or less.

In the liquid crystal display device described in Japanese Unexamined Patent Application Publication No. 2017-68016 described above, by setting an interference condition to 0th order and setting the film thickness of the transparent layer to 30 nm, a reflectance is lowered over almost the entire visible wavelength region. However, since the reflectance becomes 5% or more in a wavelength region exceeding 650 nm, the amount of reflected light may not be sufficiently suppressed, and furthermore, there is a problem in that the reflected light is colored red.

It is desirable to reduce a reflectance.

SUMMARY

A display device according to an aspect of the disclosure includes: a first color filter; a second color filter that is disposed in the same layer as the first color filter and exhibits a different color from the first color filter; a first pixel electrode that is disposed on an upper layer side with respect to the first color filter and disposed to overlap the first color filter; a second pixel electrode that is disposed on an upper layer side with respect to the second color filter and disposed to overlap the second color filter; a common electrode that is disposed on an upper layer side or a lower layer side with respect to the first pixel electrode and the second pixel electrode and overlaps the first pixel electrode and the second pixel electrode; an insulating film that is interposed between the common electrode and the first pixel electrode and the second pixel electrode; and a light blocking part that is disposed at a boundary between the first color filter and the second color filter on an upper layer side with respect to the first color filter and the second color filter. The light blocking part includes a light blocking film, a first transmission film that is disposed on an upper layer side of the light blocking film, and a reflection/transmission film that is disposed on an upper layer side of the first transmission film, the light blocking film has a light transmittance lower than a light transmittance of the first transmission film and a light transmittance of the reflection/transmission film, the first transmission film has the light transmittance higher than the light transmittance of the reflection/transmission film, and the reflection/transmission film has a light reflectance higher than a light reflectance of the first transmission film and lower than a light reflectance of the light blocking film.

DESCRIPTION OF THE EMBODIMENTS

Embodiment 1

Embodiment 1 will be described with reference to FIGS. 1 to 9. In the present embodiment, a goggle-type head-mounted display (HMD) 10HMD and a liquid crystal display device 10 used therein are exemplified. An X-axis, a Y-axis, and a Z-axis are shown in a part of each drawing, and the drawings are drawn such that the direction of each axis is the direction shown in each drawing.

Figure 1:
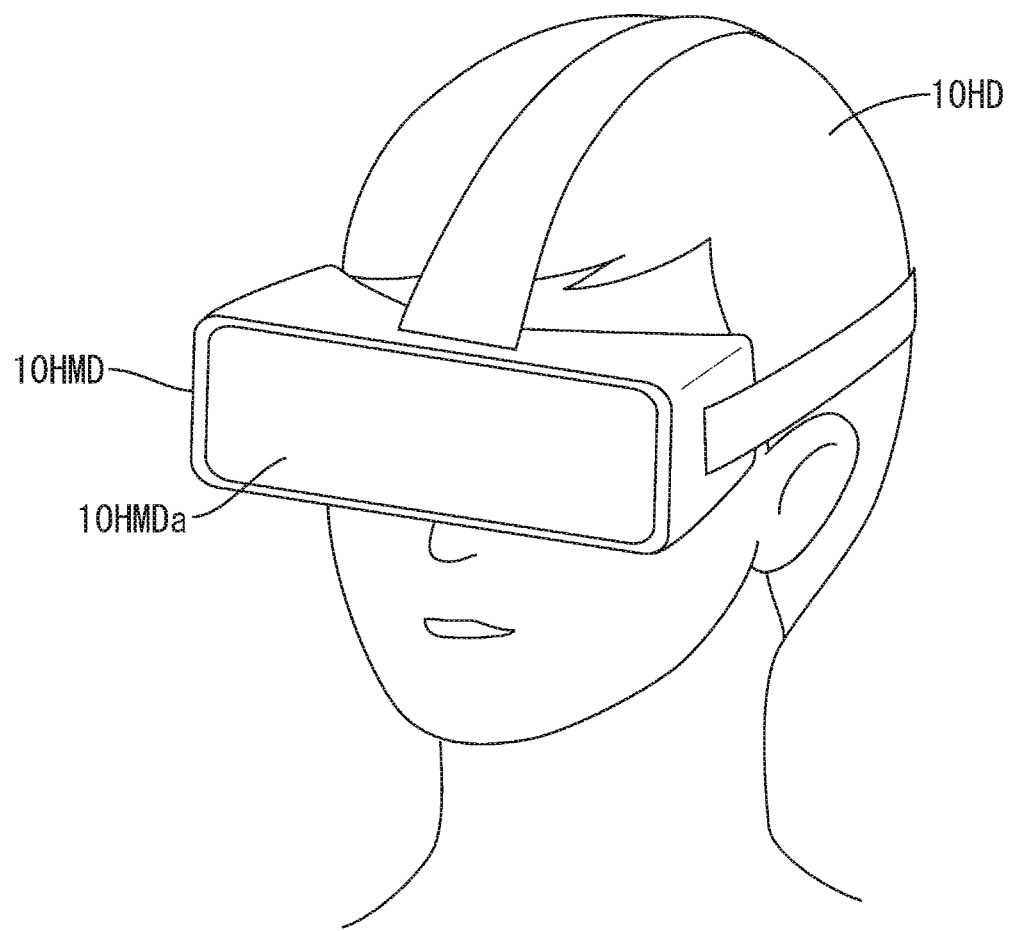
FIG. 1 is a schematic perspective view showing a state where a user wears a head-mounted display according to Embodiment 1 on the head.

The external appearance of the goggle-type head-mounted display 10HMD will be described using FIG. 1. As shown in FIG. 1, the head-mounted display 10HMD includes a head-mounted device 10HMDa that is mounted on a head 10HD of a user. The head-mounted device 10HMDa surrounds both eyes of the user.

Figure 2:
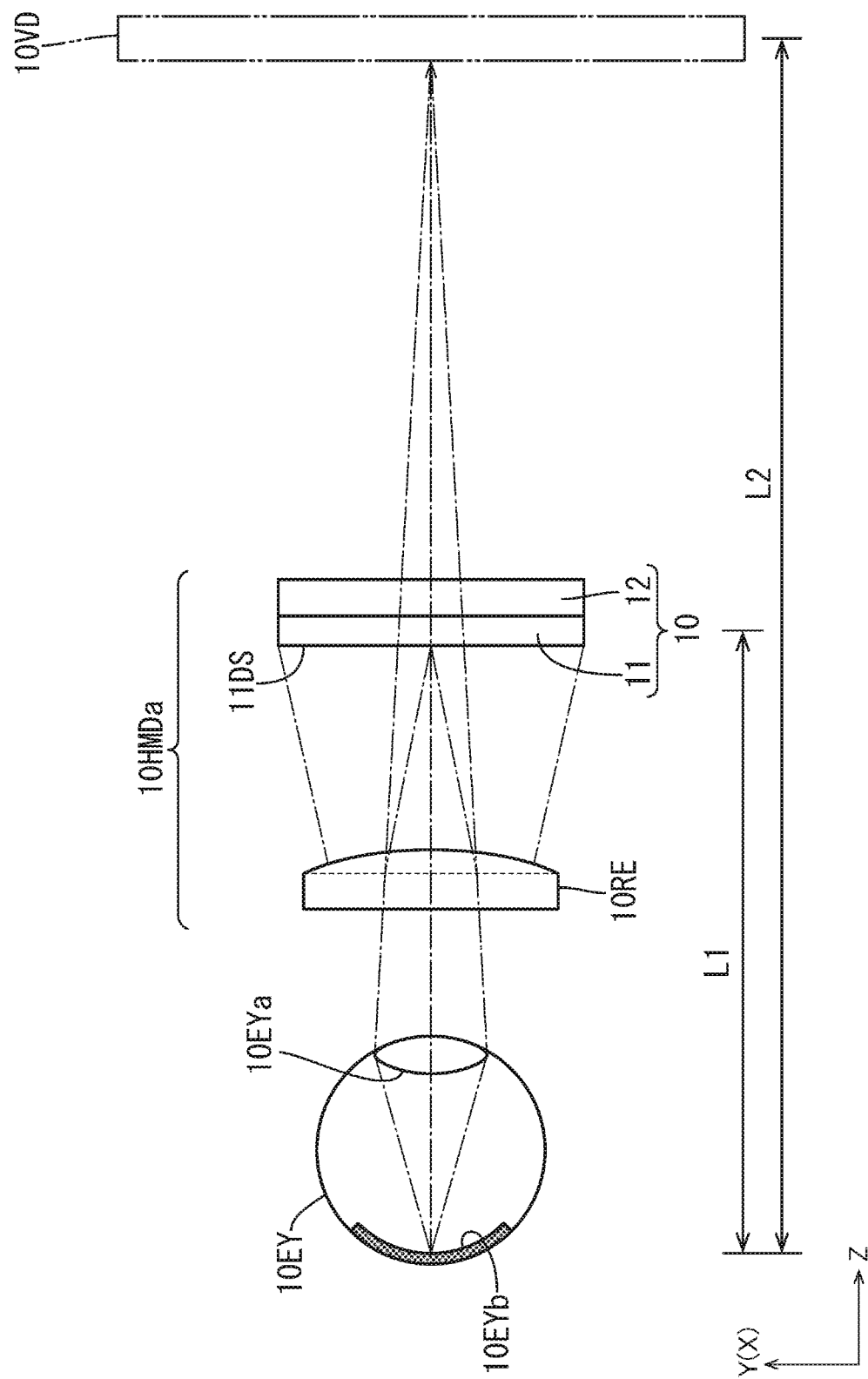
FIG. 2 is a schematic side view showing an optical relationship between a liquid crystal display device and a lens unit included in a head-mounted device that configures the head-mounted display according to Embodiment 1, and the eyeball of the user.

The configuration of the head-mounted device 10HMDa will be described using FIG. 2. As shown in FIG. 2, at least the liquid crystal display device 10 that displays an image and a lens unit 10RE that focuses the image displayed on the liquid crystal display device 10 onto an eyeball 10EY of the user are built into the head-mounted device 10HMDa. The liquid crystal display device 10 includes at least a liquid crystal panel (a display device) 11 and a backlight device (an illuminating device) 12 that irradiates the liquid crystal panel 11 with light. The principal surface on the lens unit 10RE side of the liquid crystal panel 11 is a display surface 11DS that displays an image. The lens unit 10RE is disposed to be interposed between the liquid crystal display device 10 and the eyeball 10EY of the user. The refraction action is applied to light by the lens unit 10RE. By adjusting the focal length of the lens unit 10RE, the user can recognize that the image formed on a retina 10EYb through an eye lens 10EYa of the eyeball 10EY is displayed on a virtual display 10VD that apparently exists at the position of a distance L2 from the eyeball 10EY. The distance L2 is much larger than an actual distance L1 from the eyeball 10EY to the liquid crystal display device 10. In this way, the user can visually recognize an enlarged image that is a virtual image displayed on the virtual display 10VD having a screen size (for example, in a range of about several tens of inches to several hundred inches) that is much larger than the screen size (for example, in a range of about several tenths of inches to several inches) of the liquid crystal display device 10.

It is possible to mount one liquid crystal display device 10 on the head-mounted device 10HMDa and display an image for the right eye and an image for the left eye on the liquid crystal display device 10. In addition, it is also possible to mount two liquid crystal display devices 10 on the head-mounted device 10HMDa and display an image for the right eye on the liquid crystal display device 10 on one side and an image for the left eye on the liquid crystal display device 10 on the other side. Further, the head-mounted device 10HMDa may also be provided with earphones that are placed at the ears of the user and emit sound.

Figure 3:
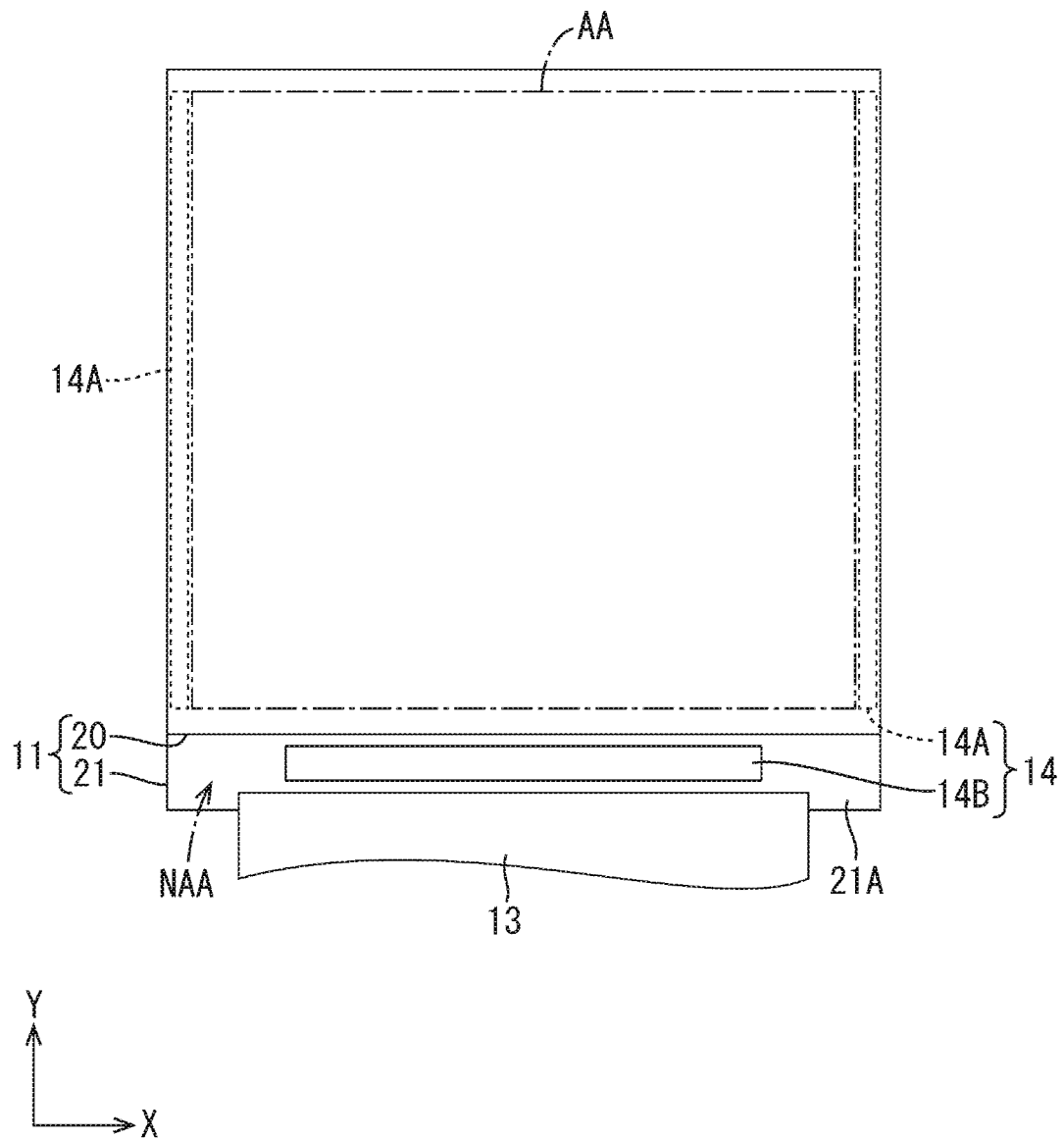
FIG. 3 is a schematic plan view of a liquid crystal panel and a flexible substrate included in the liquid crystal display device according to Embodiment 1.

The configuration of the liquid crystal panel 11 included in the liquid crystal display device 10 will be described using FIG. 3 and the like. The configuration of the backlight device 12 is as known and includes, for example, a light source such as a light emitting diode (LED) and an optical member that converts the light from the light source into planar light by applying optical action to the light. As shown in FIG. 3, the liquid crystal panel 11 has a rectangular shape as a whole when viewed in plan view. A center side portion of the screen of the liquid crystal panel 11 serves as a display area AA in which an image is displayed. The liquid crystal panel 11 has a non-display area NAA in which an image is not displayed, at a picture frame-shaped outer periphery-side portion surrounding the display area AA on the screen. In FIG. 3, the range surrounded by a dashed-dotted line is the display area AA. Since the liquid crystal panel 11 according to the present embodiment is used for the head-mounted display 10HMD described above, it has very high resolution, and its pixel density is, for example, about 1000 ppi or more.

As shown in FIG. 3, the liquid crystal panel 11 is formed by bonding a pair of substrates 20 and 21 together. The substrate that is disposed on the front side, of the pair of substrates 20 and 21, is a counter substrate (a second substrate or a CF substrate) 20, and the substrate that is disposed on the back side, of the pair of substrates 20 and 21, is an array substrate (a first substrate or an active matrix substrate) 21. Each of the counter substrate 20 and the array substrate 21 is formed by laminating various films on the inner surface side of each of glass substrates 20GS and 21GS, which are substantially transparent and excellent in translucency. The substrates 20GS and 21GS include, for example, alkali-free glass as a principal material. Of these, the array substrate 21 is larger than the counter substrate 20, and a portion thereof protrudes laterally with respect to the counter substrate 20. A flexible substrate 13 is mounted on a protruding portion 21A of the array substrate 21. The flexible substrate 13 has a configuration in which a large number of wiring patterns are formed on a base material having insulation properties and flexibility. The flexible substrate 13 is connected, on one end side thereof, to the array substrate 21 and, on the other end side, to an external control substrate (a signal supply source). Various signals that are supplied from the control substrate are transmitted to the liquid crystal panel 11 through the flexible substrate 13.

As shown in FIG. 3, a circuit part (a peripheral circuit part) 14 is provided in the non-display area NAA of the liquid crystal panel 11. The circuit part 14 includes a first circuit part 14A and a second circuit part 14B. A pair of first circuit parts 14A are disposed to interpose the display area AA from both sides in an X-axis direction. The first circuit part 14A is provided in a band-shaped range extending along a Y-axis direction. The first circuit part 14A is for supplying a scanning signal to a gate wiring line 25 (described later), and is monolithically provided on the array substrate 21. The first circuit part 14A is a gate diver monolithic (GDM) circuit. The first circuit part 14A includes a shift register circuit that outputs the scanning signal at a predetermined timing, a buffer circuit for amplifying the scanning signal, and the like. The second circuit part 14B is disposed at a position interposed between the display area AA and the flexible substrate 13 in the Y-axis direction. The second circuit part 14B is provided in a band-shaped range extending along the X-axis direction. The second circuit part 14B is for supplying an image signal (a data signal) to a source wiring line 26 (described later), and is monolithically provided on the array substrate 21. The second circuit part 14B includes a source shared driving (SSD) circuit and the like. The second circuit part 14B has a switch function of distributing the image signal that is supplied from the flexible substrate 13 to each source wiring line 26, and the like.

Figure 4:
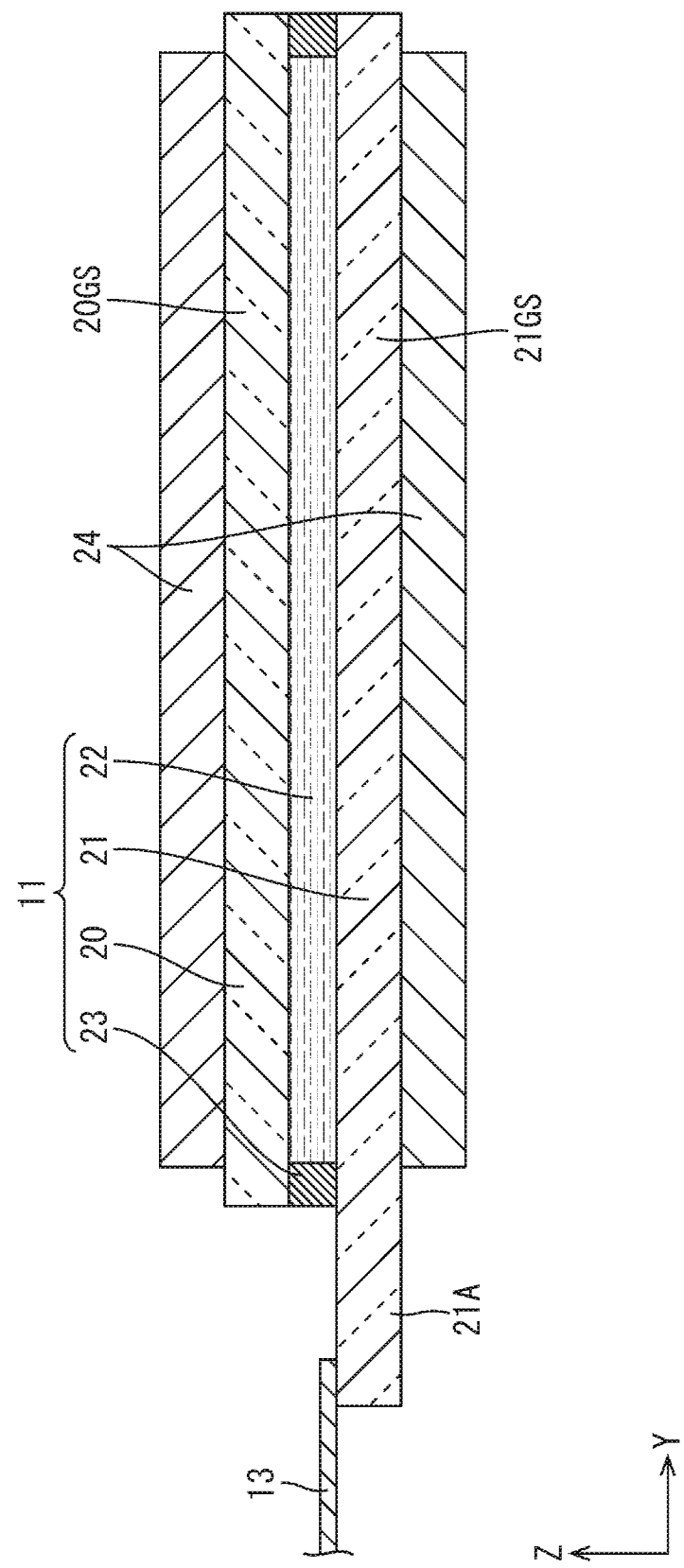
FIG. 4 is a schematic sectional view of the liquid crystal panel according to Embodiment 1.

Next, the outline of the sectional configuration of the liquid crystal panel 11 will be described using FIG. 4. As shown in FIG. 4, the pair of substrates 20 and 21 are disposed to face each other with an interval in a Z-axis direction, which is a normal direction to the plate surfaces of the substrates 20 and 21. At least a liquid crystal layer 22 and a sealing part 23 for sealing the liquid crystal layer 22 are provided to be interposed between the pair of substrates 20 and 21. The liquid crystal layer 22 includes liquid crystal molecules, which are substances whose optical characteristic changes according to the application of an electric field. The sealing part 23 has a rectangular frame shape (an endless ring shape) as a whole when viewed in plan view, and surrounds the liquid crystal layer 22 over whole circumference in the non-display area NAA. A gap (a cell gap) corresponding to the thickness of the liquid crystal layer 22 is maintained by the sealing part 23. A polarizing plate 24 is bonded to the outer surface side of each of the pair of substrates 20 and 21.

Figure 5:
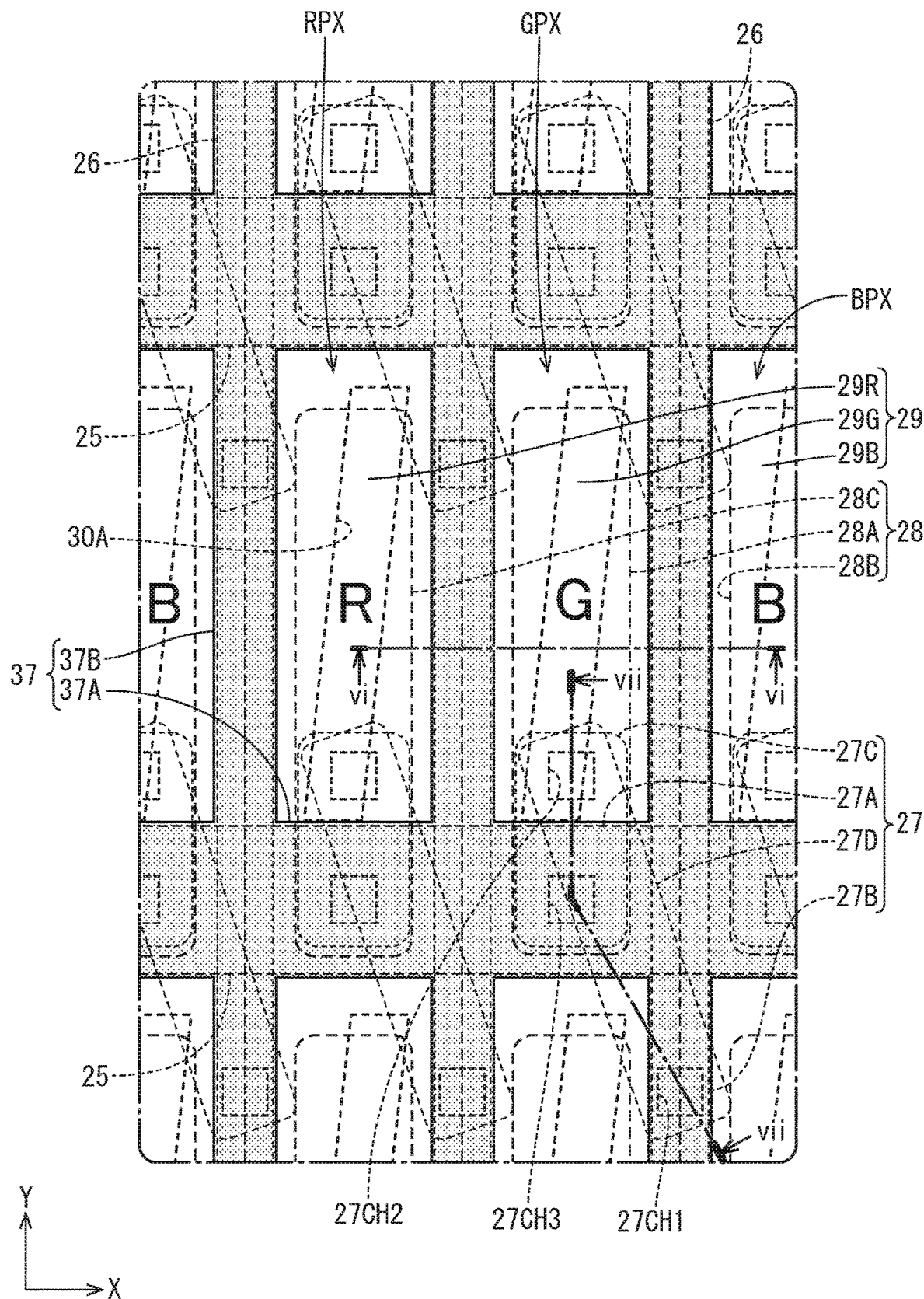
FIG. 5 is a plan view showing a pixel array in a display area of the liquid crystal panel according to Embodiment 1.

As shown in FIG. 5, a plurality of gate wiring lines (scanning wiring lines) 25 and a plurality of source wiring lines (image wiring lines) 26 are disposed in a grid pattern on the inner surface side in the display area AA of the array substrate 21. The gate wiring line 25 extends substantially along the X-axis direction in a manner of crossing the display area AA. The plurality of gate wiring lines 25 are disposed side by side at intervals in the Y-axis direction. The scanning signal that is output from the first circuit part 14A described above is supplied sequentially from the upper stage side in FIG. 5 to the plurality of gate wiring lines 25.

The source wiring line 26 extends substantially along the Y-axis direction in a manner of crossing the display area AA, and intersects the gate wiring line 25. The plurality of source wiring lines 26 are disposed at intervals in the X-axis direction. The image signal that is output from the second circuit part 14B described above is distributed to the source wiring lines 26. A thin film transistor (TFT) (a switching element) 27 and a pixel electrode 28 are provided in the vicinity of the intersection portion between the gate wiring line 25 and the source wiring line 26. A plurality of TFTs 27 and a plurality of pixel electrodes 28 are disposed side by side regularly along the X-axis direction and the Y-axis direction. The gate wiring line 25, the source wiring line 26, and the pixel electrode 28 are connected to the TFT 27. When the TFT 27 is driven based on the scanning signal that is supplied to the gate wiring line 25, the TFT 27 charges the pixel electrode 28 to a potential based on the image signal that is supplied to the source wiring line 26. The pixel electrode 28 has an elongated shape whose longitudinal direction is the Y-axis direction. One end side portion (on the lower side in FIG. 5) in the longitudinal direction of the pixel electrode 28 overlaps the gate wiring line 25 that is connected to the TFT 27 to which the pixel electrode 28 is to be connected.

Figure 6:
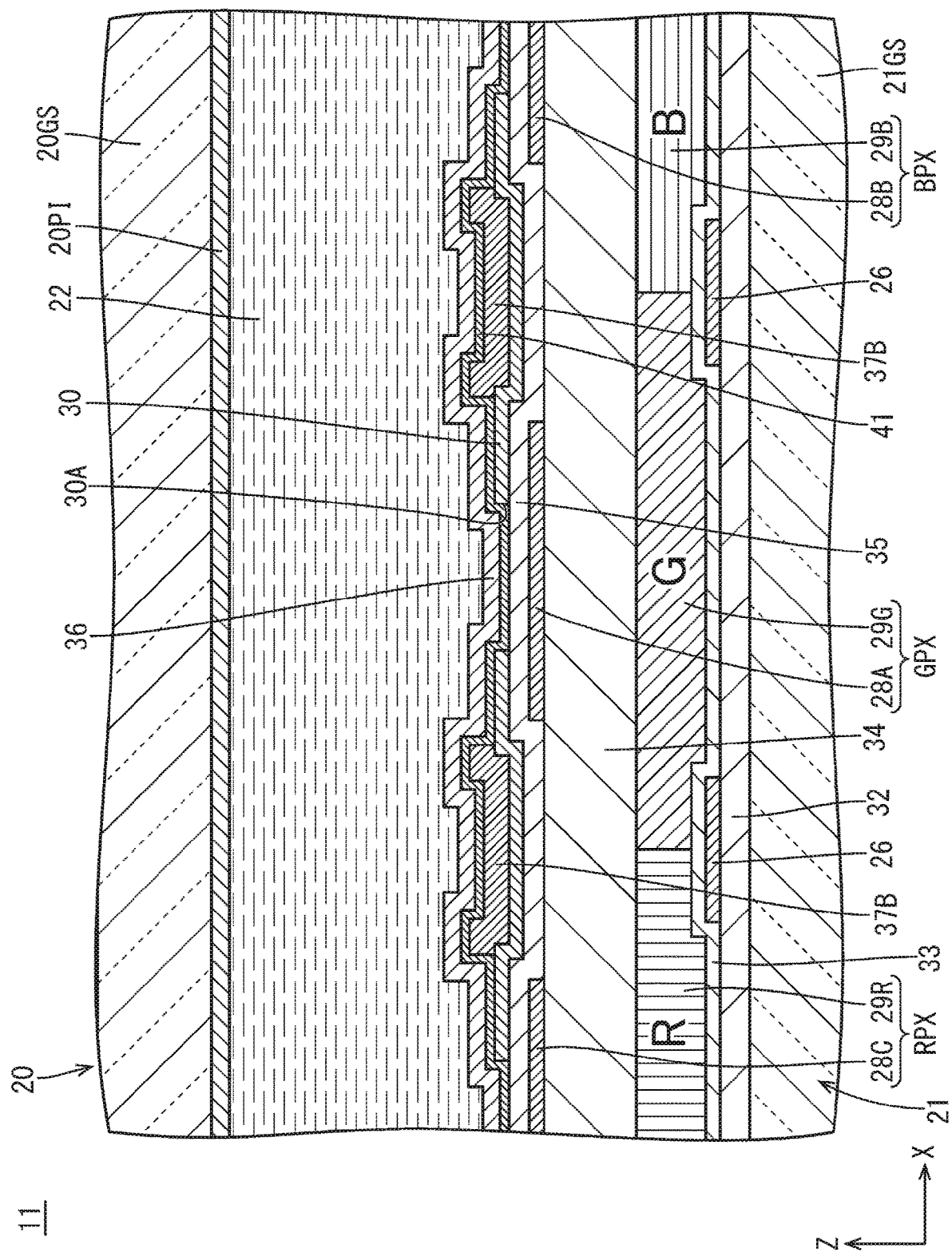
FIG. 6 is a sectional view taken along line vi-vi of FIG. 5 in the liquid crystal panel according to Embodiment 1.

As shown in FIG. 6, a color filter 29 is provided, in addition to the pixel electrode 28, on the inner surface side in the display area AA of the array substrate 21. That is, it can be said that the liquid crystal panel 11 according to the present embodiment has a color filter on array (COA) structure. The color filter 29 is disposed to overlap the pixel electrode 28, and configures, together with the overlapping pixel electrode 28, a pixel which is a display unit. The color filter 29 includes a plurality of types (three types) that exhibit colors different from each other. Three types of color filters 29 exhibiting colors different from each other are disposed side by side in an extending direction of the gate wiring line 25 (the X-axis direction). A plurality of types of color filters 29 exhibiting colors different from each other extend along an extending direction of the source wiring line 26 (approximately the Y-axis direction). In this manner, the plurality of types of color filters 29 exhibiting colors different from each other are arranged in a stripe pattern as a whole (refer to FIG. 5). The plurality of color filters 29 exhibiting colors different from each other are disposed such that their boundaries (color boundaries) overlap the source wiring line 26.

Specifically, as shown in FIG. 6, the color filters 29 include three types of color filters that include a first color filter (a green color filter) 29G that exhibits green, a second color filter (a blue color filter) 29B that exhibits blue, and a third color filter (a red color filter) 29R that exhibits red. In the following, in a case of distinguishing the color filters 29 from each other, a suffix G is added to the symbol of the first color filter exhibiting green, a suffix B is added to the symbol of the second color filter exhibiting blue, and a suffix R is added to the symbol of the third color filter exhibiting red, and in a case of being generally named without being distinguished, a suffix is not added to the symbol.

The first color filter 29G selectively transmits green light having a wavelength that is included in a green wavelength region (in a range of about 500 nm to about 570 nm). The second color filter 29B selectively transmits blue light having a wavelength that is included in a blue wavelength region (in a range of about 400 nm to about 500 nm). The third color filter 29R selectively transmits red light that is included in a red wavelength region (in a range of about 600 nm to about 780 nm). In the present embodiment, the color filters 29 are arranged repeatedly in the order of the third color filter 29R, the first color filter 29G, and the second color filter 29B from the left side of FIG. 6.

As shown in FIG. 6, the first color filter 29G configures a first pixel (a green pixel) GPX exhibiting green, together with the overlapping pixel electrode 28. The pixel electrode 28 that configures the first pixel GPX is referred to as a first pixel electrode 28A. The second color filter 29B configures a second pixel (a blue pixel) BPX exhibiting blue, together with the overlapping pixel electrode 28. The pixel electrode 28 that configures the second pixel BPX is referred to as a second pixel electrode 28B. The third color filter 29R configures a third pixel (a red pixel) RPX exhibiting red, together with the overlapping pixel electrode 28. The pixel electrode 28 that configures the third pixel RPX is referred to as a third pixel electrode 28C. In the liquid crystal panel 11, display pixels capable of performing color display with a predetermined gray scale are configured by the three color pixels GPX, BPX, and RPX arranged along the X-axis direction. The array pitch of each of the pixels GPX, BPX, and RPX in the Y-axis direction is about three times the array pitch in the X-axis direction.

As shown in FIG. 6, a common electrode 30 is provided on the inner surface side in the display area AA of the array substrate 21. The common electrode 30 is located on an upper layer side with respect to the pixel electrode 28 and is disposed over almost the entire display area AA. In this way, the common electrode 30 overlaps all the pixel electrodes 28 disposed in the display area AA. In this manner, in the array substrate 21 according to the present embodiment, an "upper layer electrode" that is an electrode which is located on an upper layer side, of the pixel electrode 28 and the common electrode 30, is the common electrode 30, and a "lower layer electrode" that is an electrode which is located on a lower layer side, of the pixel electrode 28 and the common electrode 30, is the pixel electrode 28. A plurality of slits 30A are formed to be open in portions of the common electrode 30, each of which overlaps each of the plurality of pixel electrodes 28. A common potential signal having a common potential (a reference potential) is supplied to the common electrode 30. When the pixel electrode 28 is charged to a potential based on the image signal that is transmitted to the source wiring line 26 according to the drive of the TFT 27, a potential difference is generated between the pixel electrode 28 and the common electrode 30. Then, a fringe electric field (a diagonal electric field), which includes a component along the plate surface of the array substrate 21 as well as a component in the normal direction to the plate surface of the array substrate 21, is generated between the opening edge of the slit 30A in the common electrode 30 and the pixel electrode 28. Therefore, it is possible to control the alignment state of the liquid crystal molecules contained in the liquid crystal layer 22 by utilizing this fringe electric field, and predetermined display is performed based on the alignment state of the liquid crystal molecules. That is, the operation mode of the liquid crystal panel 11 according to the present embodiment is a fringe field switching (FFS) mode.

Figure 7:
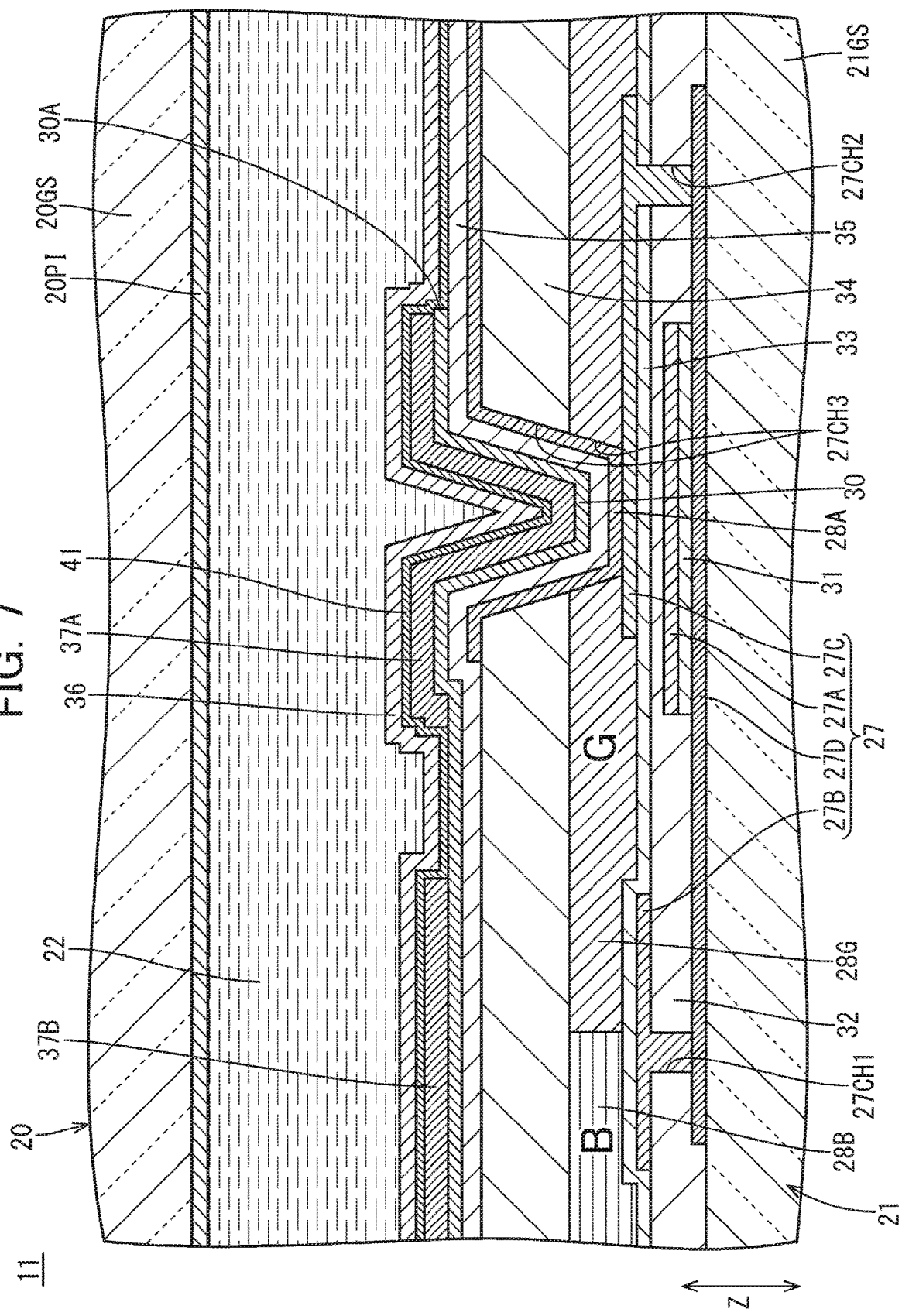
FIG. 7 is a sectional view taken along line vii-vii of FIG. 5 in the liquid crystal panel according to Embodiment 1.

Subsequently, various films that are laminated on the glass substrate 21GS of the array substrate 21 will be described in detail using FIGS. 6 and 7. As shown in FIGS. 6 and 7, in order from the lower layer side (the glass substrate 21GS side), at least a semiconductor film, a first insulating film 31, a first metal film, a second insulating film 32, a second metal film, a third insulating film 33, a first transparent electrode film, the color filter 29, a fourth insulating film 34, a second transparent electrode film, a fifth insulating film 35, a third transparent electrode film, a third metal film, a first transparent film, a fourth metal film, a second transparent film, and an alignment film 36 are laminated on the glass substrate 21GS of the array substrate 21. An alignment film 20PI is formed on the glass substrate 20GS of the counter substrate 20.

Each of the first metal film, the second metal film, the third metal film, and the fourth metal film is a single layer film made of one type of metal material, or a laminated film or an alloy made of different types of metal materials, and has electrical conductivity and a light blocking property. Of these, the first metal film configures the gate wiring line 25. The second metal film configures the source wiring line 26. The first transparent electrode film, the second transparent electrode film, and the third transparent electrode film are made of a transparent electrode material such as an indium tin oxide (ITO) or an indium zinc oxide (IZO), for example. Of these, the second transparent electrode film configures the pixel electrode 28. The third transparent electrode film configures the common electrode 30. The material of each of the second transparent electrode film and the third transparent electrode film is, for example, ITO, and the film thickness of each electrode film is, for example, about 70 nm.

Each of the first insulating film 31, the second insulating film 32, the third insulating film 33, and the fifth insulating film 35 is made of $SiO_2$ (oxide silicon, silicon oxide), $SiN_x$ (silicon nitride), or the like, which is a type of inorganic material (inorganic resin material). Of these, the second insulating film 32 is interposed between the gate wiring line 25 and the source wiring line 26 to maintain the wiring lines in an insulated state. The fifth insulating film 35 is interposed between the pixel electrode 28 and the common electrode 30 to maintain the pixel electrodes in an insulated state. The material of the fifth insulating film 35 is, for example, $SiN_x$, and the film thickness thereof is, for example, about 100 nm. The fourth insulating film 34 is made of PMMA (acrylic resin), which is a type of organic material (organic resin material), or the like. The fourth insulating film 34 which is made of an organic material usually has a thicker film thickness than the first insulating film 31, the second insulating film 32, the third insulating film 33, and the fifth insulating film 35 which are made of an inorganic material. The first insulating film 31, the second insulating film 32, the third insulating film 33, the fourth insulating film 34 and the fifth insulating film 35 are all substantially transparent. The first transparent film and the second transparent film will be described again later.

The alignment film 36 is made of an organic material such as polyimide, for example. The alignment film 36 has a function of aligning liquid crystal molecules by performing photo-alignment treatment on the upper surface that faces the liquid crystal layer 22. The film thickness of the alignment film 36 is, for example, about 85 nm. In a case where the material of the alignment film 36 is polyimide, the refractive index of the alignment film 36 is about 1.7. The alignment film 20PI that is provided on the counter substrate 20 is also similar to the alignment film 36 that is provided on the array substrate 21.

The semiconductor film is made of an oxide semiconductor material. Specifically, the semiconductor film is made of an oxide thin film containing, for example, indium (In), gallium (Ga), and zinc (Zn), each of which is one type of oxide semiconductor. The oxide thin film containing indium (In), gallium (Ga), and zinc (Zn) is regarded as being amorphous or crystalline. The oxide semiconductor material of the semiconductor film has a characteristic in which the resistance value in a state where no voltage is applied (off state) is higher than that of a silicon semiconductor material. Further, the oxide semiconductor material of the semiconductor film has higher electron mobility than the amorphous silicon semiconductor material. By providing the TFT 27 using such a semiconductor film, off-leakage current of the TFT 27 can be reduced, so that power consumption can be reduced. Further, since the TFT 27 can be downsized, this is suitable for improving the resolution of the liquid crystal panel 11. It is particularly suitable for using the liquid crystal panel 11 in the head-mounted display 10HMD.

The array substrate 21 may be provided with another semiconductor film (a second semiconductor film) on the lower layer side with respect to the semiconductor film described above. This second semiconductor film is made of, for example, a silicon semiconductor material. More specifically, a continuous grain silicon (CG silicon) thin film, which is a type of poly-crystallized silicon thin film (polycrystalline silicon thin film), can be used as the second semiconductor film. The CG silicon thin film is formed, for example, by adding a metal material to an amorphous silicon thin film and performing heat treatment for a short time at a low temperature of about 550° C. or lower, whereby continuity is provided in the atomic array at the crystal grain boundaries of silicon crystals. The silicon semiconductor material of the second semiconductor film has higher electron mobility than the oxide semiconductor material. A TFT that is included in the circuit part 14 can be provided using such a second semiconductor film. In this way, the switching speed of the TFT included in the circuit part 14 can be increased, so that it becomes difficult for display defects such as a flicker or an afterimage to occur in an image which is displayed by the pixel electrodes 28 in the display area AA.

Subsequently, the TFT 27 will be described in detail. As shown in FIGS. 5 and 7, the TFT 27 includes a gate electrode 27A, a source electrode 27B, a drain electrode 27C, and a semiconductor part 27D. The semiconductor part 27D is made of a semiconductor film. The semiconductor part 27D is located on the lower layer side with respect to all of the source electrode 27B, the drain electrode 27C, and the gate electrode 27A. The semiconductor part 27D diagonally extends to intersect both the gate wiring line 25 and the source wiring line 26. One end side portion of the semiconductor part 27D overlaps the source electrode 27B (the source wiring line 26), and the other end side portion overlaps the drain electrode 27C. A center side portion of the semiconductor part 27D overlaps the gate electrode 27A (the gate wiring line 25).

The gate electrode 27A is made of the same first metal film as the gate wiring line 25. As shown in FIG. 7, the gate electrode 27A is disposed to overlap the upper layer side with respect to the semiconductor part 27D with the first insulating film 31 interposed therebetween. The gate electrode 27A is disposed to overlap the center side portion of the semiconductor part 27D. The gate electrode 27A and the semiconductor part 27D are maintained in an insulated state by interposing the first insulating film 31 therebetween. The first insulating film 31 is provided only in a range overlapping the gate electrode 27A, and has an island shape in the display area AA. The gate electrode 27A is made of a part of the gate wiring line 25 (refer to FIG. 5). When a scanning signal is supplied to the gate electrode 27A, a channel region is created in the semiconductor part 27D due to an electric field acting on the semiconductor part 27D from the gate electrode 27A.

The source electrode 27B is made of the same second metal film 35 as the source wiring line 26. As shown in FIG.

7, the source electrode 27B is disposed to overlap the upper layer side with respect to one end side portion of the semiconductor part 27D with the second insulating film 32 interposed therebetween. The source electrode 27B is disposed at a position which does not overlap the gate electrode 27A. The source electrode 27B is made of a part of the source wiring line 26 (refer to FIG. 5). A first contact hole 27CH1 is provided in the second insulating film 32 interposed between the source electrode 27B and the semiconductor part 27D. The source electrode 27B is connected to one end side portion of the semiconductor part 27D through the first contact hole 27CH1 of the second insulating film 32.

The drain electrode 27C is made of the first transparent electrode film. As shown in FIG. 5, the drain electrode 27C extends along the Y-axis direction, and one end side portion (on the upper side in FIG. 5) overlaps a part of the semiconductor part 27D. The other end side portion (on the lower side in FIG. 5) of the drain electrode 27C overlaps a part of the gate electrode 27A or the pixel electrode 28. As shown in FIG. 7, one end side portion of the drain electrode 27C is disposed to overlap the upper layer side with respect to the other end side portion of the semiconductor part 27D with the second insulating film 32 and the third insulating film 33 interposed therebetween. A second contact hole 27CH2 is provided in the second insulating film 32 and the third insulating film 33 interposed between the drain electrode 27C and the semiconductor part 27D. The drain electrode 27C is connected to the other end side portion of the semiconductor part 27D through the second contact hole 27CH2 provided in the second insulating film 32 and the third insulating film 33.

As shown in FIG. 7, the other end side portion of the drain electrode 27C is disposed to overlap the upper layer side with respect to the center side portion of the semiconductor part 27D and the gate electrode 27A with the second insulating film 32 and the third insulating film 33 interposed therebetween. The drain electrode 27C is also disposed to overlap most of the gate electrode 27A. The drain electrode 27C and the gate electrode 27A are maintained in an insulated state by interposing the second insulating film 32 and the third insulating film 33 therebetween. The other end side portion of the drain electrode 27C is disposed to overlap the lower layer side with respect to one end side portion in the longitudinal direction of the pixel electrode 28 with the color filter 29 and the fourth insulating film 34 interposed therebetween. A third contact hole 27CH3 is provided in the color filter 29 and the fourth insulating film 34 interposed between the drain electrode 27C and the pixel electrode 28. The drain electrode 27C is connected to one end side portion in the longitudinal direction of the pixel electrode 28 through the third contact hole 27CH3 provided in the color filter 29 and the fourth insulating film 34.

As shown in FIGS. 6 and 7, a light blocking part 37 that is located on the upper layer side with respect to the color filter 29 is provided on the inner surface side in the display area AA of the array substrate 21. In the present embodiment, the light blocking part 37 is disposed on the upper layer side of the common electrode 30. The light blocking part 37 can block light that is emitted, for example, from the backlight device 12 toward the liquid crystal panel 11. As shown in FIG. 5, the light blocking part 37 has a substantially grid-like planar shape and provides a partition between the pixel electrodes 28 adjacent to each other in the X-axis direction and the Y-axis direction. The light blocking part 37 is disposed to overlap the gate wiring line 25 and the source wiring line 26 when viewed in plan view. Specifically, the light blocking part 37 includes a plurality of first light blocking parts 37A extending along the X-axis direction and overlapping the plurality of gate wiring lines 25, and a plurality of second light blocking parts 37B extending along the Y-axis direction and overlapping the plurality of source wiring lines 26. In FIG. 6, the second light blocking part 37B is shown, and in FIG. 7, the first light blocking part 37A is shown. A region surrounded by two first light blocking parts 37A and two second light blocking parts 37B, which are in a relationship of sandwiching the pixel electrode 28 therebetween, defines an opening range of the pixel electrode 28. The above region transmits the light transmitted through the color filter 29 that overlaps the pixel electrode 28, and allows the light to be emitted to the outside of the liquid crystal panel 11. The first light blocking part 37A provides a partition between the plurality of pixel electrodes 28 arranged along the Y-axis direction, and can block light that attempts to pass between the pixels GPX, BPX, and RPX adjacent to each other in the Y-axis direction. The second light blocking part 37B provides a partition between the plurality of pixel electrodes 28 arranged along the X-axis direction, and is disposed at the boundary between the color filters 29G, 29B, and 29R that exhibit colors different from each other. The light that attempts to pass between the pixels GPX, BPX, and RPX adjacent to each other in the X-axis direction can be blocked by the second light blocking part 37B. That is, the second light blocking part 37B can prohibit color mixing between the pixels GPX, BPX, and RPX that exhibit colors different from each other. As described above, display independence of each of the pixels GPX, BPX, and RPX can be ensured by the light blocking part 37. The light blocking part 37 may also be provided in the non-display area NAA of the array substrate 21. In that case, the light blocking part 37 is disposed in a solid pattern in the non-display area NAA of the array substrate 21.

In this manner, the liquid crystal panel 11 according to the present embodiment has a COA structure in which, in addition to the pixel electrodes 28 and the color filters 29 that configure the pixels GPX, BPX, and RPX, the light blocking part 37 is provided on the array substrate 21, as shown in FIG. 6. Here, in the process of manufacturing the liquid crystal panel 11, when the array substrate 21 and the counter substrate 20 are bonded together in a state of facing each other, there is a possibility that a position shift may occur between both the substrates 20 and 21 in the direction (the X-axis direction or the Y-axis direction) along the principal surfaces of both the substrates 20 and 21. The term "position shift" that is used below means a "position shift in the direction along the principal surfaces of both the substrates 20 and 21". Even in a case where the position shift described above occurs between both the substrates 20 and 21, a situation such as the occurrence of a position shift between the first color filter 29G and the first pixel electrode 28A, a position shift between the second color filter 29B and the second pixel electrode 28B, a position shift between the third color filter 29R and the third pixel electrode 28C, or a position shift between each of the color filters 29G, 29B, and 29R and the light blocking part 37 can be avoided. In particular, it is suitable in a case where the higher resolution progresses, as in the liquid crystal panel 11 that is used in the head-mounted display 10HMD.

Figure 8:
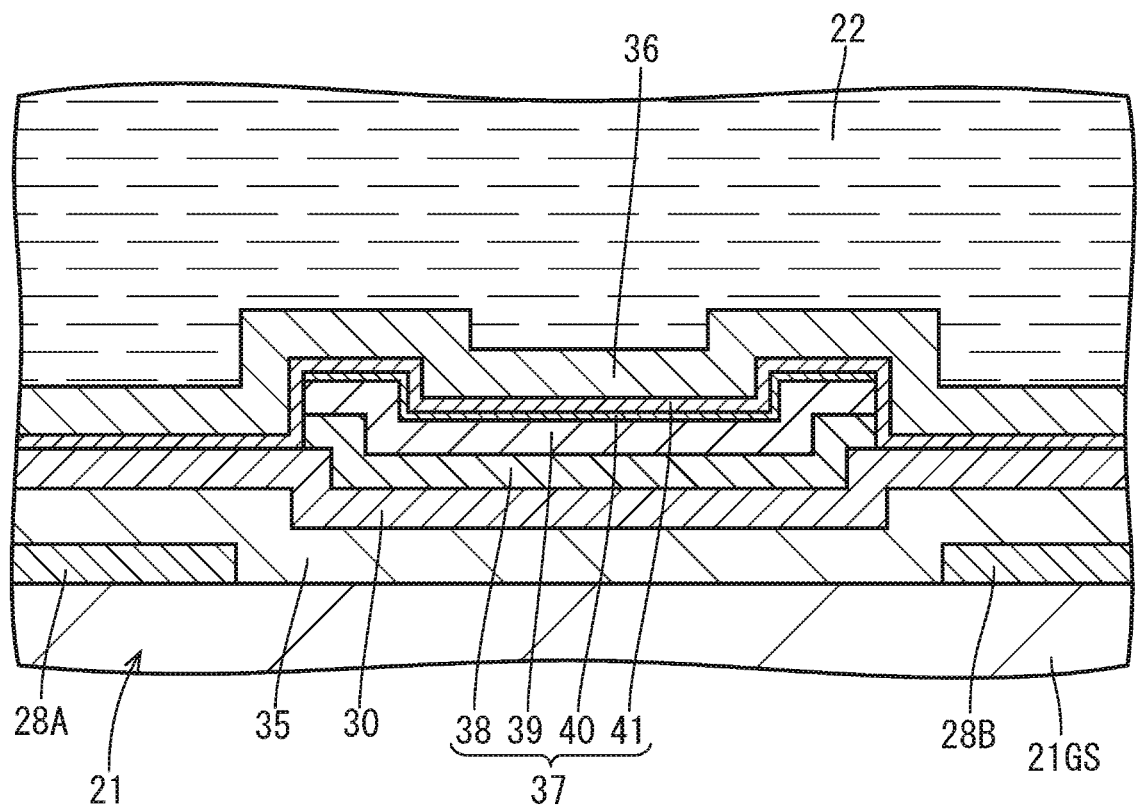
FIG. 8 is an enlarged sectional view of a pixel electrode, a common electrode, an alignment film, a light blocking part, and the like included in the liquid crystal panel according to Embodiment 1.

A detailed configuration of the light blocking part 37 will be described with reference to FIG. 8. As shown in FIG. 8, the light blocking part 37 according to the present embodiment has a multilayer film structure as described below. That is, the light blocking part 37 includes at least a light blocking film 38, a first transmission film 39 disposed on the upper layer side of the light blocking film 38, and a reflection/transmission film 40 disposed on the upper layer side of the first transmission film 39.

The light blocking film 38 is made of the third metal film. That is, the light blocking film 38 that is located at the lowest layer in the light blocking part 37 is disposed on the upper layer side of the common electrode 30 made of the third transparent electrode film, as shown in FIG. 8. As the metal material of the third metal film that configures the light blocking film 38, for example, molybdenum (Mo), tungsten (W), molybdenum tungsten (MoW) which is an alloy of Mo and W, aluminum (Al), copper (Cu), or the like can be given. Specifically, the material of the light blocking film 38 may be Mo. The film thickness of the light blocking film 38 is desirably about 30 nm or more, and may be about 60 nm, for example, in order to exhibit the function of blocking light that is emitted from the backlight device 12. The light blocking film 38 has a lower light transmittance and a higher light blocking property than the first transmission film 39 and the reflection/transmission film 40. Further, the light blocking film 38 has a higher light reflectance than the first transmission film 39 and the reflection/transmission film 40.

The first transmission film 39 is made of the first transparent film that is disposed on the upper layer side of the third metal film. As the material of the first transparent film that configures the first transmission film 39, a material that is substantially transparent and has a high refractive index is desirable, and for example, $SiN_x$, $SiO_2$, ITO, or the like can be used. That is, the material of the first transmission film 39 may be an insulating material or may be a conductive material. Specifically, the material of the first transmission film 39 may be $SiN_x$. In a case where the material of the first transmission film 39 is $SiN_x$, the refractive index of the first transmission film 39 is about 1.9. The film thickness of the first transmission film 39 is desirably in a range of about 20 nm to about 100 nm and may be, for example, about 60 nm, because the first transmission film 39 exhibits a function of reducing reflected light due to thin film interference (described later). The film thickness of the first transmission film 39 may be the same as the film thickness of the light blocking film 38. The first transmission film 39 is substantially transparent and has a higher light transmittance than the reflection/transmission film 40.

The reflection/transmission film 40 is made of the fourth metal film. As the metal material of the fourth metal film that configures the reflection/transmission film 40, for example, Mo, W, MoW, Al, Cu, or the like can be used. In the present embodiment, the material of the fourth metal film is the same as the material of the third metal film. Specifically, the material of the reflection/transmission film 40 may be Mo. The film thickness of the reflection/transmission film 40 is smaller than the film thickness of the light blocking film 38. The film thickness of the reflection/transmission film 40 is desirably in a range of about 3 nm to about 20 nm and may be, for example, about 5 nm, because the reflection/transmission film 40 exhibits a function of reducing reflection of external light (described later) and a function of re-reflecting the light reflected by the light blocking film 38 (described later). The reflection/transmission film 40 has a lower light transmittance than the first transmission film 39 and also has a higher light reflectance and a higher light blocking property than the first transmission film 39. The reflection/transmission film 40 has a higher light transmittance and a lower light reflectance than the light blocking film 38.

The light blocking film 38, the first transmission film 39, and the reflection/transmission film 40 that configure the light blocking part 37 having such a configuration overlap one another, so that none of the films protrudes when viewed in plan view. Therefore, when manufacturing the array substrate 21, the light blocking film 38, the first transmission film 39, and the reflection/transmission film 40 can patterned by successively forming the third metal film, the first transparent film, and the fourth metal film, then forming, exposing, and developing a photoresist film, and collectively etching (for example, dry-etching) the third metal film, the first transparent film, and the fourth metal film through the patterned photoresist film.

The light blocking film 38 having the lowest light transmittance, of the light blocking part 37, mainly functions to block the light that is emitted from the backlight device 12. That is, the light that attempts to pass between the pixels GPX, BPX, and RPX adjacent to each other in the X-axis direction and the Y-axis direction can be blocked by the light blocking film 38. The light blocking film 38 has the lowest light transmittance and the highest light reflectance in the light blocking part 37. Therefore, the amount of reflected light that is generated when external light incident on the liquid crystal panel 11 from the outside on the front side is reflected by the light blocking film 38 is greater than the amount of reflected light by the reflection/transmission film 40. If the light reflected by the light blocking film 38 is emitted as it is, there is a concern that display quality may be considerably lowered.

On the other hand, the first transmission film 39 and the reflection/transmission film 40 of the light blocking part 37 mainly function to suppress reflection of external light incident on the liquid crystal panel 11 from the outside on the front side. Specifically, when the external light described above has passed through the counter substrate 20 and the liquid crystal layer 22, the light is incident on the reflection/transmission film 40 of the light blocking part 37. Since the reflection/transmission film 40 has a lower light reflectance and a higher light transmittance than the light blocking film 38, the generation of reflected light is suppressed. In the present embodiment, since the film thickness of the reflection/transmission film 40 is about 5 nm, which is 20 nm or less, the light reflectance is sufficiently lower than that of the light blocking film 38 and the light transmittance is sufficiently higher than that of the light blocking film 38, whereby the reflection of external light by the reflection/transmission film 40 is sufficiently suppressed.

Part of external light passes through the reflection/transmission film 40 and is incident on the first transmission film 39. Part of the light incident on the first transmission film 39 is reflected at the interface between the reflection/transmission film 40 and the first transmission film 39, and the remaining light passes through the first transmission film 39, which has a higher light transmittance than the reflection/transmission film 40, and is incident on the light blocking film 38. Part of the light incident on the light blocking film 38 is reflected at the interface between the first transmission film 39 and the light blocking film 38. The reflected light at the interface between the reflection/transmission film 40 and the first transmission film 39 and the reflected light at the interface between the first transmission film 39 and the light blocking film 38 are canceled out to some extent, based on an interference condition according to the refractive index and film thickness of the first transmission film 39. Specifically, in the present embodiment, the film thickness of the first transmission film 39 is in a range of about 20 nm to about 100 nm, and the refractive index of the first transmission film 39 is about 1.9, and therefore, the wavelength at the reflectance that is minimized by using the first transmission film 39 as an interference film becomes sufficiently close to 555 nm, which is the wavelength at which the relative luminous efficiency is the highest. For example, if the film thickness of the first transmission film 39 is about 60 nm within the range of about 20 nm to about 100 nm, the wavelength at the reflectance that is minimized by using the first transmission film 39 as an interference film becomes around 550 nm. Due to the above, the reflection of external light by the light blocking part 37 can be sufficiently suppressed.

The light reflected at the interface between the first transmission film 39 and the light blocking film 38, that is, the light reflected by the upper surface of the light blocking film 38, passes through the first transmission film 39 and reaches the interface between the reflection/transmission film 40 and the first transmission film 39. Since the reflection/transmission film 40 has a higher light reflectance than the first transmission film 39, part of the light reflected by the light blocking film 38 can be re-reflected toward the light blocking film 38 side. That is, part of the light reflected by the light blocking film 38 is repeatedly reflected between the light blocking film 38 and the reflection/transmission film 40 and is not emitted to the outside on the front side. In the present embodiment, since the film thickness of the reflection/transmission film 40 is about 5 nm, which is 3 nm or more, the light reflected by the light blocking film 38 can be sufficiently re-reflected by the reflection/transmission film 40. In this way, the emission of the light reflected by the light blocking film 38 is suppressed. As described above, according to the light blocking part 37 according to the present embodiment, the reflection of external light is suppressed by using the first transmission film 39 as an interference film, and in addition, the reflection of external light is suppressed by the reflection/transmission film 40 having a lower light reflectance that the light blocking film 38 and the light reflected by the light blocking film 38 is re-reflected by the reflection/transmission film 40, whereby emission of light is suppressed. In this manner, the lower reflection of the light blocking part 37 is realized, so that a decrease in the display quality due to the installation of the light blocking part 37 can be sufficiently suppressed.

As shown in FIG. 8, the light blocking part 37 includes a second transmission film 41 that is disposed on the upper layer side of the reflection/transmission film 40. The second transmission film 41 extends beyond the formation range of the light blocking part 37 and covers the common electrode 30 and the like beyond the formation range of the light blocking part 37. Therefore, although the portion that overlaps the reflection/transmission film 40, of the second transmission film 41, configures the light blocking part 37, the portion that does not overlap the reflection/transmission film 40, of the second transmission film 41, does not configure the light blocking part 37. Specifically, the second transmission film 41 is provided in a solid pattern over the entire area of at least the display area AA within the principal surface of the array substrate 21. The second transmission film 41 covers the portion that does not overlap the light blocking part 37, of the common electrode 30, and covers the portion that overlaps the slit 30A of the common electrode 30, of the fifth insulating film 35. In this manner, the common electrode 30 can be protected by the portion that extends beyond the formation range of the light blocking part 37, of the second transmission film 41.

The second transmission film 41 is made of the second transparent film. As the material of the second transparent film that configures the second transmission film 41, a material that is substantially transparent and has a high refractive index is desirable, and for example, $SiN_x$, $SiO_2$, ITO, or the like can be used. That is, the material of the second transmission film 41 may be an insulating material or may be a conductive material. The material of the second transmission film 41 may be the same as the material of the first transmission film 39. Specifically, the material of the second transmission film 41 may be $SiN_x$. In a case where the material of the second transmission film 41 is $SiN_x$, the refractive index of the second transmission film 41 is about 1.9. The film thickness of the second transmission film 41 is smaller than the film thickness of the first transmission film 39 and may be, for example, about 20 nm. The second transmission film 41 is substantially transparent and has a higher light transmittance than the reflection/transmission film 40.

External light incident on the liquid crystal panel 11 from the outside on the front side is incident on the second transmission film 41 prior to the reflection/transmission film 40. Part of the light incident on the second transmission film 41 is reflected by the upper surface of the second transmission film 41, and the remaining light passes through the second transmission film 41 and is incident on the reflection/transmission film 40. Part of the light incident on the reflection/transmission film 40 is reflected at the interface between the second transmission film 41 and the reflection/transmission film 40. The reflected light at the upper surface of the second transmission film 41 and the reflected light at the interface between the second transmission film 41 and the reflection/transmission film 40 are canceled out to some extent, based on an interference condition according to the refractive index and film thickness of the second transmission film 41. Specifically, in the present embodiment, the film thickness of the second transmission film 41 is about 20 nm and the refractive index of the second transmission film 41 is about 1.9, and therefore, the wavelength at the reflectance that is minimized by using the second transmission film 41 as an interference film can be set to around 550 nm. Due to the above, the reflection of external light by the light blocking part 37 can be further suppressed.

As shown in FIG. 8, the alignment film 36 is disposed on the upper layer side of the second transmission film 41 described above. The alignment film 36 is substantially transparent and has a higher light transmittance than the reflection/transmission film 40. The film thickness of the alignment film 36 is larger than the film thickness of the first transmission film 39. The refractive index of the alignment film 36 is smaller than the refractive index of the second transmission film 41. The alignment film 36 is provided to cover the entire area of the second transmission film 41. Therefore, external light incident on the liquid crystal panel 11 from the outside on the front side is incident on the alignment film 36 prior to the second transmission film 41. Part of the light incident on the alignment film 36 is reflected by the upper surface of the alignment film 36, and the remaining light passes through the alignment film 36 and is incident on the second transmission film 41. Part of the light incident on the second transmission film 41 is reflected at the interface between the alignment film 36 and the second transmission film 41. The reflected light at the upper surface of the alignment film 36 and the reflected light at the interface between the alignment film 36 and the second transmission film 41 are canceled out to some extent, based on an interference condition according to the refractive index and film thickness of the alignment film 36. Specifically, in the present embodiment, the film thickness of the alignment film 36 is about 85 nm and the refractive index of the alignment film 36 is about 1.7, and therefore, the wavelength at the reflectance that is minimized by using the alignment film 36 as an interference film can be set to around 550 nm. Due to the above, the reflection of external light by the light blocking part 37 can be further suppressed.

Figure 9:
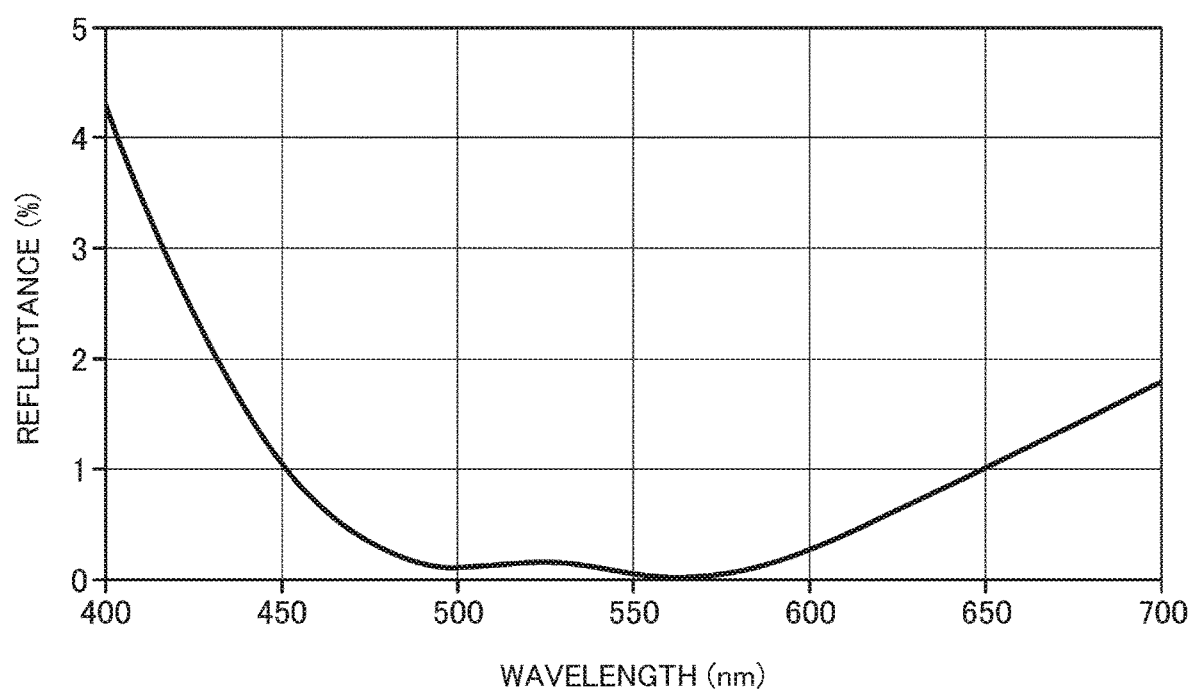
FIG. 9 is a graph showing a reflection spectrum related to the light blocking part in Demonstration Experiment 1 according to Embodiment 1.

Next, Demonstration Experiment 1 using the liquid crystal panel 11 according to the present embodiment will be described. In Demonstration Experiment 1, in the liquid crystal panel 11 provided with the light blocking part 37 having the configuration described above, the relationship between the wavelength of light irradiated to the light blocking part 37 from the upper layer side and the light reflectance by the light blocking part 37 was trial-calculated by simulation. The trial calculation results are shown in FIG. 9. FIG. 9 is a graph showing the reflection spectrum (spectral reflectance) related to the light blocking part 37. The vertical axis of FIG. 9 is the light reflectance (unit: "%") by the light blocking part 37, and the horizontal axis is the light wavelength (unit: "nm"). In the liquid crystal panel 11 related to Demonstration Experiment 1, in order from the lower layer side, the film thickness of the pixel electrode 28 is about 70 nm, the film thickness of the fifth insulating film 35 is about 100 nm, the film thickness of the common electrode 30 is about 70 nm, the film thickness of the light blocking film 38 is about 60 nm, the film thickness of the first transmission film 39 is about 60 nm and the refractive index is about 1.9, the film thickness of the reflection/transmission film 40 is about 5 nm, the film thickness of the second transmission film 41 is about 20 nm and the refractive index is about 1.9, and the film thickness of the alignment film 36 is about 85 nm and the refractive index is about 1.7. Further, the material of each of the pixel electrode 28 and the common electrode 30 is ITO, the material of each of the light blocking film 38 and the reflection/transmission film 40 is Mo, the material of each of the fifth insulating film 35, the first transmission film 39, and the second transmission film 41 is $SiN_x$, and the material of the alignment film 36 is polyimide.

The results of Demonstration Experiment 1 will be described using FIG. 9. According to FIG. 9, results were obtained in which the light reflectance by the light blocking part 37 was about 5% or less in almost the entire visible wavelength region (at least the wavelength range of about 400 nm to about 700 nm). In particular, in the wavelength range of about 600 nm to about 700 nm, which is a red wavelength region, the light reflectance by the light blocking part 37 is about 2% or less. In this way, it can be said that a situation does not easily occur in which the reflected light takes on a specific tinge such as red, for example. As described above, the reflection of external light by the light blocking part 37 is suppressed, and display quality can be improved.

As described above, the liquid crystal panel (display device) 11 of the present embodiment includes the first color filter 29G, the second color filter 29B that is disposed in the same layer as the first color filter 29G and exhibits a different color from the first color filter 29G, the first pixel electrode 28A that is disposed on the upper layer side with respect to the first color filter 29G and disposed to overlap the first color filter 29G, the second pixel electrode 28B that is disposed on the upper layer side with respect to the second color filter 29B and disposed to overlap second color filter 29B, the common electrode 30 that is disposed on the upper layer side or the lower layer side with respect to the first pixel electrode 28A and the second pixel electrode 28B and overlaps the first pixel electrode 28A and the second pixel electrode 28B, the fifth insulating film (insulating film) 35 that is interposed between the common electrode 30 and the first pixel electrode 28A and the second pixel electrode 28B, and the light blocking part 37 that is disposed at the boundary between the first color filter 29G and the second color filter 29B on the upper layer side with respect to the first color filter 29G and the second color filter 29B, in which the light blocking part 37 includes the light blocking film 38, the first transmission film 39 that is disposed on the upper layer side of the light blocking film 38, and the reflection/transmission film 40 that is disposed on the upper layer side of the first transmission film 39, the light blocking film 38 has a lower light transmittance than the first transmission film 39 and the reflection/transmission film 40, the first transmission film 39 has a higher light transmittance than the reflection/transmission film 40, and the reflection/transmission film 40 has a higher light reflectance than the first transmission film 39 and a lower light reflectance than the light blocking film 38.

The light which attempts to pass between the first color filter 29G and the second color filter 29B is blocked by the light blocking film 38 of the light blocking part 37, which has a lower light transmittance than the first transmission film 39 and the reflection/transmission film 40. In this way, it becomes difficult for color mixing to occur, so that display by the first pixel electrode 28A and display by the second pixel electrode 28B are performed appropriately.

External light incident on the light blocking part 37 from the upper layer side is incident on the reflection/transmission film 40. Since the reflection/transmission film 40 has a lower light reflectance than the light blocking film 38, generation of reflected light is suppressed. Part of external light passes through the reflection/transmission film 40 and is incident on the first transmission film 39. Part of the light incident on the first transmission film 39 is reflected at the interface between the reflection/transmission film 40 and the first transmission film 39, and the remaining light passes through the first transmission film 39, which has a higher light transmittance than the reflection/transmission film 40, and is incident on the light blocking film 38. Part of the light incident on the light blocking film 38 is reflected at the interface between the first transmission film 39 and the light blocking film 38. The reflected light at the interface between the reflection/transmission film 40 and the first transmission film 39 and the reflected light at the interface between the first transmission film 39 and the light blocking film 38 are canceled out to some extent, based on an interference condition according to the refractive index and film thickness of the first transmission film 39. In this way, the reflection of external light by the light blocking part 37 is suppressed.

The light reflected at the interface between the first transmission film 39 and the light blocking film 38 passes through the first transmission film 39 and reaches the interface between the reflection/transmission film 40 and the first transmission film 39. Since the reflection/transmission film 40 has a higher light reflectance than the first transmission film 39, part of the light reflected by the light blocking film 38 can be re-reflected toward the light blocking film 38 side. In this way, the emission of the light reflected by the light blocking film 38 is suppressed. As described above, the reflection of external light is suppressed by using the first transmission film 39 as an interference film, and in addition, the reflection of external light is suppressed by the reflection/transmission film 40 having a lower light reflectance that the light blocking film 38 and the light reflected by the light blocking film 38 is re-reflected by the reflection/transmission film 40, whereby emission of light is suppressed. In this manner, the light reflectance by the light blocking part 37 can be made about 5% or less over almost the entire visible wavelength region, and in particular, the light reflectance by the light blocking part 37 can be made about 2% or less in the wavelength range of about 600 nm to about 700 nm, and also, a situation is not easily occur in which the reflected light takes on a specific tinge. As described above, the reflection of external light by the light blocking part 37 is suppressed, and display quality can be improved.

Further, the reflection/transmission film 40 has a film thickness in a range of about 3 nm to about 20 nm. If the film thickness of the reflection/transmission film 40 is less than about 3 nm, there is a concern that the light reflected by the light blocking film 38 may not be sufficiently re-reflected by the reflection/transmission film 40, and there is a concern that it may become difficult to form the reflection/transmission film 40. If the film thickness of the reflection/transmission film 40 exceeds about 20 nm, a large amount of external light is reflected by the reflection/transmission film 40, and there is a concern that the reflection of external light by the light blocking part 37 may not be sufficiently suppressed. In this regard, the film thickness of the reflection/transmission film 40 is set to be in a range of about 3 nm to about 20 nm, so that the light reflected by the light blocking film 38 can be sufficiently re-reflected by the reflection/transmission film 40 and the reflection of external light by the reflection/ transmission film 40 can be sufficiently suppressed, and furthermore, the reflection/transmission film 40 can be easily formed.

Further, the first transmission film 39 has a film thickness in a range of about 20 nm to about 100 nm. If the film thickness of the first transmission film 39 is less than about 20 nm or exceeds about 100 nm, the wavelength at the reflectance which is minimized by using the first transmission film 39 as an interference film is too far away from 555 nm, which is a wavelength at which the relative luminous efficiency is the highest, and there is a concern that the reflection of external light by the light blocking part 37 may not be sufficiently suppressed. In this regard, the film thickness of the first transmission film 39 is set to be in a range of about 20 nm to about 100 nm, so that the wavelength at the reflectance which is minimized by using the first transmission film 39 as an interference film becomes sufficiently close to 555 nm, which is a wavelength at which the relative luminous efficiency is the highest. In this way, the reflection of external light by the light blocking part 37 can be sufficiently suppressed.

Further, the reflection/transmission film 40 is made of the same material as the light blocking film 38 and has a smaller film thickness than the light blocking film 38. The film thickness of the reflection/transmission film 40 made of the same material as the light blocking film 38 is set to be smaller than that of the light blocking film 38, so that the light transmittance in the reflection/transmission film 40 can be made higher than the light transmittance in the light blocking film 38 and the light reflectance in the reflection/ transmission film 40 can be made lower than the light reflectance in the light blocking film 38.

Further, the light blocking part 37 is disposed on the upper layer side of the common electrode 30, which is an upper layer electrode that is located on the upper layer side, of the first pixel electrode 28A and the second pixel electrode 28B, and the common electrode 30. In this way, compared to a case where the light blocking part 37 is disposed on the lower layer side of the common electrode 30 which is an upper layer electrode, more light which attempts to pass between the first color filter 29G and the second color filter 29B can be blocked by the light blocking film 38 included in the light blocking part 37. In this way, it becomes more difficult for color mixing to occur, so that display by the first pixel electrode 28A and display by the second pixel electrode 28B are performed more appropriately.

Further, the light blocking part 37 includes the second transmission film 41 that is disposed on the upper layer side of the reflection/transmission film 40, and the second transmission film 41 extends beyond the formation range of the light blocking part 37 and covers the common electrode 30, which is an upper layer electrode, beyond the formation range of the light blocking part 37. The common electrode 30, which is an upper layer electrode, can be protected by the second transmission film 41 extending beyond the formation range of the light blocking part 37.

Further, the liquid crystal panel (display device) 11 includes the array substrate (the first substrate) 21 on which the first color filter 29G, the second color filter 29B, the first pixel electrode 28A, the second pixel electrode 28B, the common electrode 30, the fifth insulating film 35, and the light blocking part 37 are provided, and the counter substrate (the second substrate) 20 that is disposed to face the array substrate 21. When the array substrate 21 and the counter substrate 20 are bonded together in a state of facing each other, there is a possibility that a position shift may occur between both the substrates 20 and 21. Even in a case where a position shift occurs between both the substrates 20 and 21, a situation such as the occurrence of a position shift between the first color filter 29G and the first pixel electrode 28A, a position shift between the second color filter 29B and the second pixel electrode 28B, or a position shift between the first color filter 29G and the second color filter 29B, and the light blocking part 37 can be avoided. In particular, it is suitable in a case where the higher resolution progresses.

Further, the liquid crystal panel (display device) 11 includes the liquid crystal layer 22 that is interposed between the array substrate 21 and the counter substrate 20, and the alignment film 36 that is provided on the array substrate 21 and has an upper surface facing the liquid crystal layer 22, in which the light blocking part 37 includes the second transmission film 41 that is disposed on the upper layer side with respect to the reflection/transmission film 40, the second transmission film 41 extends beyond the formation range of the light blocking part 37 and covers the common electrode 30, which is an upper layer electrode that is located on the upper layer side, of the first pixel electrode 28A and the second pixel electrode 28B, and the common electrode 30, at least beyond the formation range of the light blocking part 37, and the alignment film 36 is disposed on the upper layer side of the second transmission film 41. External light that has passed through the counter substrate 20 and the liquid crystal layer 22 is incident on the alignment film 36. Part of the external light incident on the alignment film 36 is reflected by the upper surface of the alignment film 36, and the remaining light passes through the alignment film 36 and is incident on the second transmission film 41. Part of the light incident on the second transmission film 41 is reflected at the interface between the alignment film 36 and the second transmission film 41. The reflected light at the upper surface of the alignment film 36 and the reflected light at the interface between the alignment film 36 and the second transmission film 41 are canceled out to some extent, based on an interference condition according to the refractive index and film thickness of the alignment film 36. In this manner, the reflection of external light is further suppressed by using the alignment film 36 as an interference film.

Embodiment 2

Embodiment 2 will be described with reference to FIG. 10 or 11. In Embodiment 2, a case is shown where the configuration of a light blocking part 137 is changed. With respect to the same structure, operation, and effects as those in Embodiment 1 described above, overlapping description will be omitted.

Figure 10:
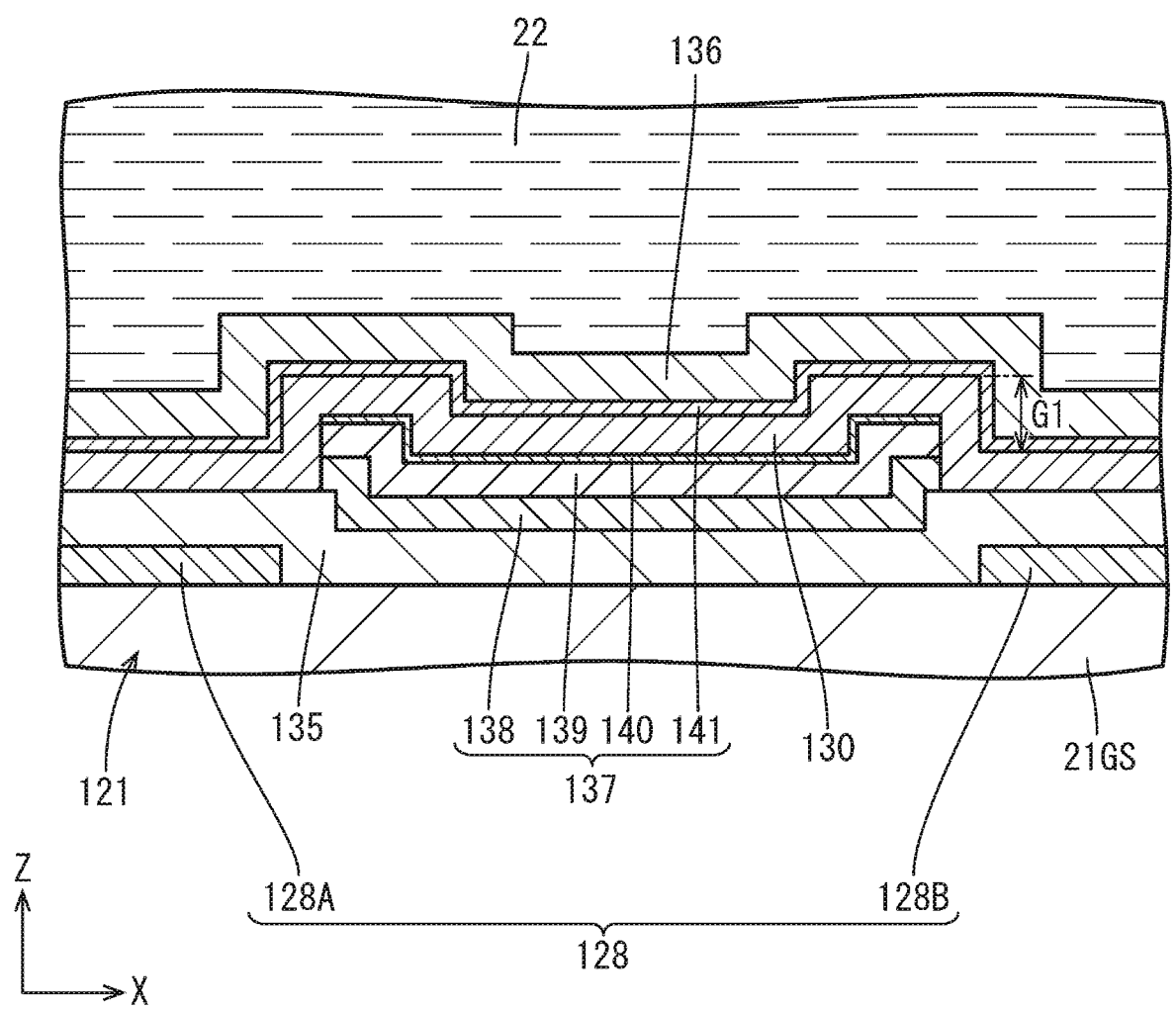
FIG. 10 is an enlarged sectional view of a pixel electrode, a common electrode, an alignment film, a light blocking part, and the like included in a liquid crystal panel according to Embodiment 2.
Figure 11:
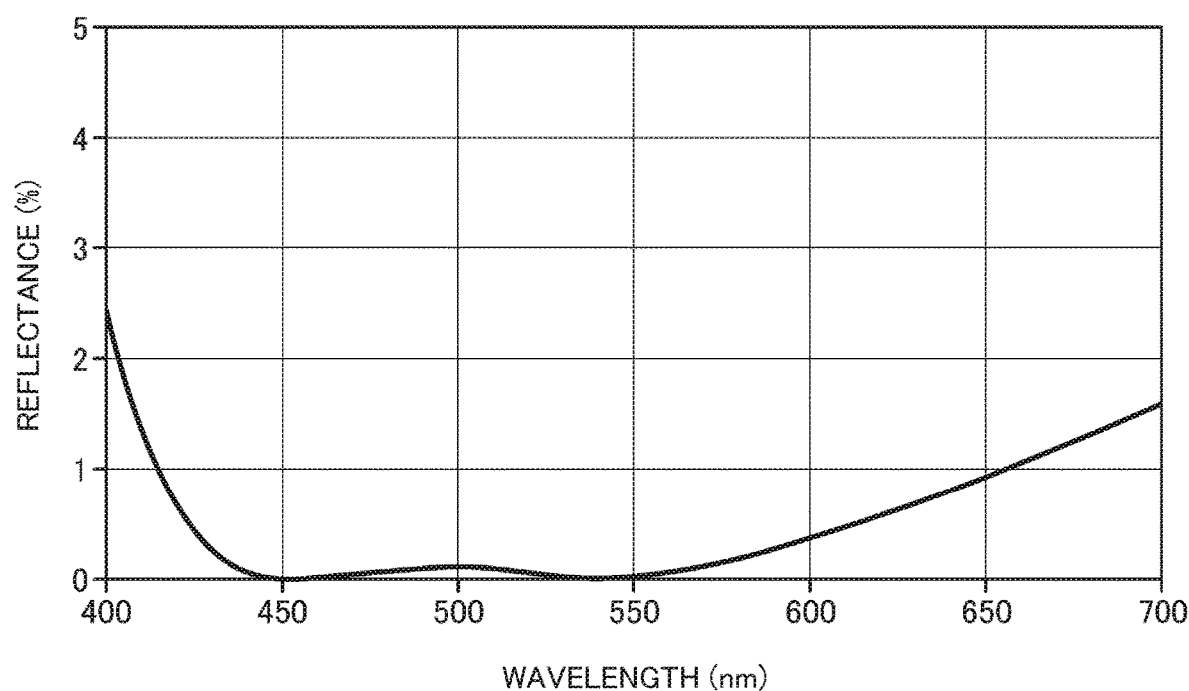
FIG. 11 is a graph showing a reflection spectrum related to the light blocking part in Demonstration Experiment 2 according to Embodiment 2.

As shown in FIG. 10, the light blocking part 137 according to the present embodiment is disposed on the lower layer side of a common electrode 130 and on the upper layer side of a fifth insulating film 135. As described in Embodiment 1, the common electrode 130 is an upper layer electrode that is located on the upper layer side, of a pixel electrode 128 and the common electrode 130. In the light blocking part 137, a light blocking film 138 is disposed on the upper layer side of the fifth insulating film 135. A first transmission film 139 is disposed on the upper layer side of the light blocking film 138. A reflection/transmission film 140 is disposed on the upper layer side of the first transmission film 139. A second transmission film 141 is disposed on the upper layer side of the common electrode 130. That is, the common electrode 130 is disposed on the upper layer side of the reflection/transmission film 140 and on the lower layer side of the second transmission film 141. Specifically, although the portion that overlaps the light blocking part 137, of the common electrode 130, is located on the upper layer side of the reflection/transmission film 140, the portion that does not overlap the light blocking part 137, of the common electrode 130, is located on the upper layer side of the fifth insulating film 135. That is, a level difference G1 corresponding to the total film thickness of the light blocking film 138, the first transmission film 139, and the reflection/transmission film 140 that configure the light blocking part 137 (the film thickness of the light blocking part 137) is created between the portion that overlaps the light blocking part 137, of the common electrode 130, and the portion that does not overlap the light blocking part 137, of the common electrode 130. The common electrode 130 having such a configuration is covered with the second transmission film 141 that is disposed on the upper layer side within and beyond the formation range of the light blocking part 137. In this way, the common electrode 130 can be protected within and beyond the formation range of the light blocking part 137. The material of the common electrode 130 is, for example, ITO. The common electrode 130 has a film thickness of, for example, about 70 nm, and a refractive index of, for example, about 2.1. The common electrode 130 is substantially transparent and has a higher light transmittance than the reflection/transmission film 140. The film thickness of the common electrode 130 is larger than the film thickness of the first transmission film 139, and the refractive index of the common electrode 130 is larger than the refractive index of each of the first transmission film 139, the second transmission film 141, and an alignment film 136.

In this manner, the common electrode 130 that is located on the upper layer side of the reflection/transmission film 140 is formed as follows, when manufacturing the array substrate 121. That is, as in Embodiment 1, the third metal film, the first transparent film, and the fourth metal film that have been successively formed are collectively patterned to provide the light blocking film 138, the first transmission film 139, and the reflection/transmission film 140, and then the third transparent electrode film is formed. Subsequently, the common electrode 130 can be patterned by forming, exposing, and developing a photoresist film, and etching (for example, wet etching) the third transparent electrode film through the patterned photoresist film.

In the light blocking part 137 having such a configuration, when external light incident on the liquid crystal panel 11 from the outside on the front side passes through the second transmission film 141, the light is incident on the common electrode 130 prior to the reflection/transmission film 140. Part of the light incident on the common electrode 130 is reflected at the interface between the second transmission film 141 and the common electrode 130, and the remaining light passes through the common electrode 130 and is incident on the reflection/transmission film 140. Part of the light incident on the reflection/transmission film 140 is reflected at the interface between the common electrode 130 and the reflection/transmission film 140. The reflected light at the interface between the second transmission film 141 and the common electrode 130 and the reflected light at the interface between the common electrode 130 and the reflection/transmission film 140 are canceled out to some extent, based on an interference condition according to the refractive index and film thickness of the common electrode 130. Specifically, in the present embodiment, the film thickness of the common electrode 130 is about 70 nm and the refractive index of the common electrode 130 is about 2.1, and therefore, the wavelength at the reflectance which is minimized by using the common electrode 130 as an interference film can be set to around 550 nm. Due to the above, the reflection of external light by the light blocking part 137 can be suppressed further than in Embodiment 1. Further, since the light blocking film 138 is restrained from being laminated on the common electrode 130, it becomes possible to use a material having low adhesion to the common electrode 130 (the transparent electrode film) as the material of the light blocking film 138, and the degree of freedom in material selection is improved. In this way, it becomes possible to improve the light blocking performance of the light blocking film 138 and to make the light blocking film 138 thinner.

Next, Demonstration Experiment 2 using the liquid crystal panel 11 according to the present embodiment will be described. In Demonstration Experiment 2, in the liquid crystal panel 11 provided with the light blocking part 137 having the configuration described above, the relationship between the wavelength of light irradiated to the light blocking part 137 from the upper layer side and the light reflectance by the light blocking part 137 was trial-calculated by simulation. The trial calculation results are shown in FIG. 11. FIG. 11 is a graph showing the reflection spectrum (spectral reflectance) related to the light blocking part 137. The vertical axis of FIG. 11 is the light reflectance (unit: "%") by the light blocking part 137, and the horizontal axis is the wavelength (unit: "nm") of light. In the liquid crystal panel 11 related to Demonstration Experiment 2, in order from the lower layer side, the film thickness of the pixel electrode 128 is about 70 nm, the film thickness of the fifth insulating film 135 is about 100 nm, the film thickness of the light blocking film 138 is about 60 nm, the film thickness of the first transmission film 139 is about 60 nm and the refractive index is about 1.9, the film thickness of the reflection/transmission film 140 is about 5 nm, the film thickness of the common electrode 130 is about 70 nm and the refractive index is about 2.1, the film thickness of the second transmission film 141 is about 20 nm and the refractive index is about 1.9, and the film thickness of the alignment film 136 is about 85 nm and the refractive index is about 1.7. Further, the material of each of the pixel electrode 128 and the common electrode 130 is ITO, the material of each of the light blocking film 138 and the reflection/transmission film 140 is Mo, the material of each of the fifth insulating film 135, the first transmission film 139, and the second transmission film 141 is $SiN_x$, and the material of the alignment film 136 is polyimide.

The results of Demonstration Experiment 2 will be described using FIG. 11. According to FIG. 11, results were obtained in which the light reflectance by the light blocking part 137 was about 3% or less in almost the entire visible wavelength region (at least the wavelength range of about 400 nm to about 700 nm). As in Embodiment 1, the light reflectance by the light blocking part 137 is about 2% or less in the wavelength range of about 600 nm to about 700 nm. In particular, in the wavelength range of about 450 nm to about 650 nm, the light reflectance by the light blocking part 137 is about 1% or less, and furthermore, the light reflectance by the light blocking part 137 at 550 nm is less than about 0.1%. In this way, it can be said that a situation does not easily occur in which the reflected light takes on a specific tinge such as red, for example. As described above, compared to the results in Demonstration Experiment 1, the reflection of external light by the light blocking part 137 is further suppressed and display quality can be further improved.

As described above, according to the present embodiment, the light blocking part 137 is disposed on the upper layer side of the fifth insulating film 135 and on the lower layer side of the common electrode 130, which is an upper layer electrode that is located on the upper layer side, of a first pixel electrode 128A and a second pixel electrode 128B, and the common electrode 130. External light is incident on the common electrode 130, which is an upper layer electrode, prior to the light blocking part 137. Part of the external light incident on the common electrode 130, which is an upper layer electrode, is reflected by the upper surface of the common electrode 130 that is an upper layer electrode, and the remaining light passes through the common electrode 130 that is an upper layer electrode, and is incident on the reflection/transmission film 140 of the light blocking part 137. Part of the light incident on the reflection/transmission film 140 is reflected at the interface between the common electrode 130, which is an upper layer electrode, and the reflection/transmission film 140. The reflected light at the upper surface of the common electrode 130 that is an upper layer electrode, and the reflected light at the interface between the common electrode 130, which is an upper layer electrode, and the reflection/transmission film 140 are canceled out to some extent, based on an interference condition according to the refractive index and film thickness of the common electrode 130 that is an upper layer electrode. In this manner, the reflection of external light is further suppressed by using the common electrode 130, which is an upper layer electrode, as an interference film. In particular, since the light reflectance by the light blocking part 137 can be set to about 3% or less over almost the entire visible wavelength region, the amount of reflected light can be further suppressed. Further, it becomes possible to use a material having low adhesion to the common electrode 130, which is an upper layer electrode, as the material of the light blocking film 138, and the degree of freedom in material selection is improved.

Further, the light blocking part 137 includes the second transmission film 141 that is disposed on the upper layer side with respect to the reflection/transmission film 140, and the second transmission film 141 extends beyond the formation range of the light blocking part 137 and covers the common electrode 130, which is an upper layer electrode, within and beyond the formation range of the light blocking part 137. The common electrode 130, which is an upper layer electrode, can be protected by the second transmission film 141 within and beyond the formation range of the light blocking part 137.

Embodiment 3

Embodiment 3 will be described with reference to FIG. 12. In Embodiment 3, a case is shown where the configuration of a light blocking part 237 is changed from that in Embodiment 2 described above. With respect to the same structure, operation, and effects as those in Embodiment 2 described above, overlapping description will be omitted.

Figure 12:
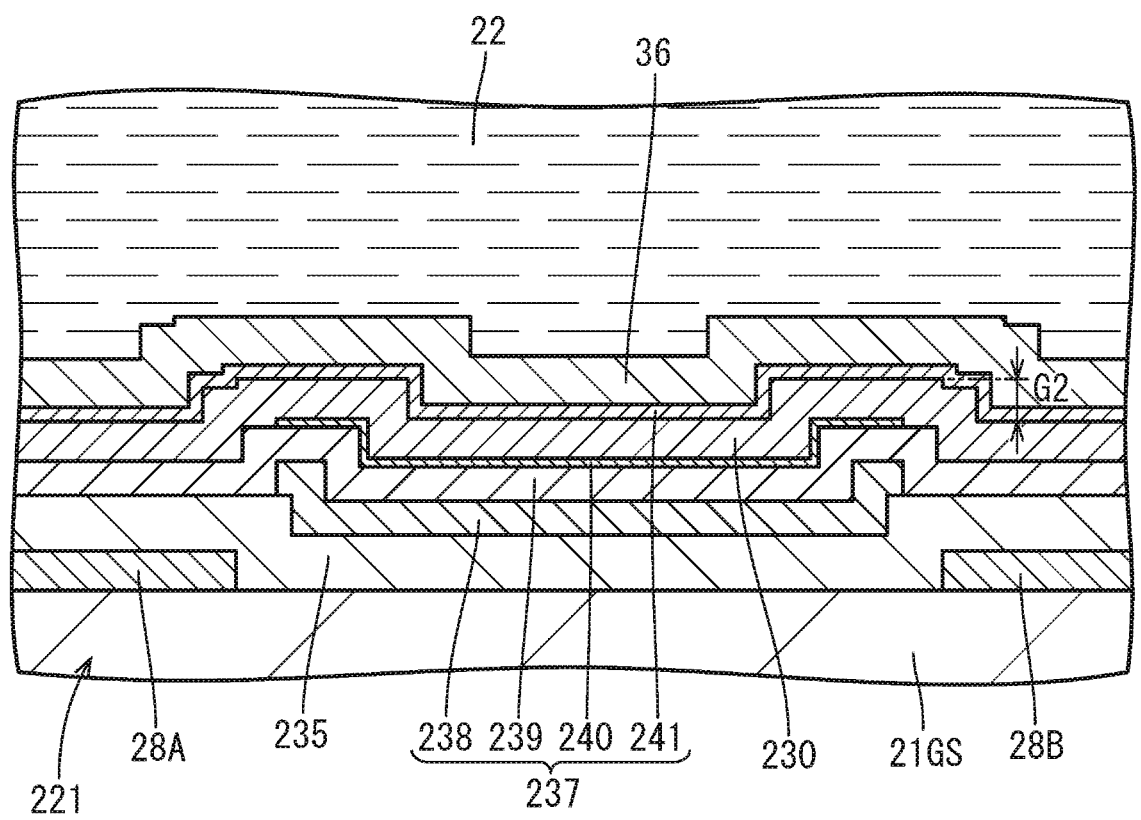
FIG. 12 is an enlarged sectional view of a pixel electrode, a common electrode, an alignment film, a light blocking part, and the like included in a liquid crystal panel according to Embodiment 3.

As shown in FIG. 12, a first transmission film 239 that configures the light blocking part 237 according to the present embodiment extends beyond the formation range of the light blocking part 237, and is disposed in contact with a fifth insulating film 235 beyond the formation range of the light blocking part 237. Therefore, although the portion that overlaps a reflection/transmission film 240, of the first transmission film 239, configures the light blocking part 237, the portion that does not overlap the reflection/transmission film 240, of the first transmission film 239, does not configure the light blocking part 237. Specifically, the first transmission film 239 is provided in a solid pattern over at least the entire display area AA within the principal surface of an array substrate 221, like a second transmission film 241. The portion that extends beyond the formation range of the light blocking part 237, of the first transmission film 239, is in contact with the upper surface of the portion that does not overlap the light blocking part 237, of the fifth insulating film 235.

The portion that does not overlap the light blocking part 237, of a common electrode 230 that is disposed on the upper layer side of the reflection/transmission film 240, is in contact with the upper surface of the first transmission film 239. Therefore, a level difference G2 corresponding to the total film thickness of a light blocking film 238 and the reflection/transmission film 240, which configure the light blocking part 237, is created between the portion that overlaps the light blocking part 237, of the common electrode 230, and the portion that does not overlap the light blocking part 237, of the common electrode 230. Compared to Embodiment 2 described above, the portion that does not overlap the light blocking part 237, of the common electrode 230, is increased by an amount corresponding to the film thickness of the first transmission film 239. Therefore, the level difference G2 that is created between the portion that overlaps the light blocking part 237, of the common electrode 230, and the portion that does not overlap the light blocking part 237, of the common electrode 230, becomes smaller by an amount corresponding to the film thickness of the first transmission film 239 than the level difference G1 (refer to FIG. 10) described in Embodiment 2 described above. In this way, it becomes difficult for a problem such as film breakage to occur in the common electrode 230 and the like provided within and beyond the formation range of the light blocking part 237 on the upper layer side of the reflection/transmission film 240.

The first transmission film 239 is made of the same material as the fifth insulating film 235. Specifically, the material of each of the first transmission film 239 and the fifth insulating film 235 is $SiN_x$ and has the same refractive index of about 1.9. In this way, it is possible to avoid refraction of light occurring at the interface between the first transmission film 239 and the fifth insulating film 235 that are in contact with each other beyond the formation range of the light blocking part 237. In this way, the display quality is kept good.

The light blocking film 238 and the reflection/transmission film 240 are disposed to overlap each other. The first transmission film 239 is interposed between the light blocking film 238 and the reflection/transmission film 240. Therefore, the light blocking film 238 and the reflection/transmission film 240 are formed as follows, when manufacturing the array substrate 221. That is, after the third metal film is formed, subsequently, a photoresist film is formed, exposed, and developed, and the third metal film is etched (for example, dry-etched) through the patterned photoresist film, whereby the light blocking film 238 can be patterned. Next, the first transparent film is formed. The first transmission film 239 is configured by the first transparent film in a solid pattern. Thereafter, after the fourth metal film is formed, a photoresist film is formed, exposed, and developed. Here, a photomask that is used when exposing the photoresist film on the fourth metal film has the same pattern as a photomask that is used when exposing the photoresist film on the third metal film. That is, a common manufacturing device is used to pattern the light blocking film 238 and the reflection/transmission film 240. The reflection/transmission film 240 can be patterned by etching (for example, dry-etching) the fourth metal film through the patterned photoresist film.

As described above, according to the present embodiment, the first transmission film 239 extends beyond the formation range of the light blocking part 237 and is disposed in contact with the fifth insulating film 235 beyond the formation range of the light blocking part 237. In a case where the first transmission film 239 is provided only in the formation range of the light blocking part 237, the level difference between the upper surface of the reflection/transmission film 240 within the formation range of the light blocking part 237 and the upper surface of the fifth insulating film 235 beyond the formation range of the light blocking part 237 corresponds to the thickness of the light blocking part 237. In contrast, by configuring the first transmission film 239 to extend beyond the formation range of the light blocking part 237, the level difference G2 that is created between the portion that overlaps the light blocking part 237, of the common electrode 230 that is an upper layer electrode, and the portion that does not overlap the light blocking part 237, of the common electrode 230, becomes smaller by an amount corresponding to the film thickness of the first transmission film 239 rather than the film thickness of the light blocking part 237. In this way, it becomes difficult for a problem such as film breakage to occur in the common electrode 230, which is an upper layer electrode, and the like disposed on the upper layer side of the reflection/transmission film 240.

Further, the first transmission film 239 is made of a material having the same refractive index as the fifth insulating film 235. In this way, it is possible to avoid refraction of light occurring at the interface between the first transmission film 239 and the fifth insulating film 235 beyond the formation range of the light blocking part 237. In this way, the display quality is kept good.

Further, the light blocking film 238 and the reflection/transmission film 240 are disposed to overlap each other. In a case where the light blocking film 238 and the reflection/transmission film 240 are patterned by using, for example, a photolithography method when manufacturing them, a common manufacturing device can be used.

Other Embodiments

The present disclosure is not limited to the embodiments described above and illustrated in the drawings, and also includes, for example, the following embodiments within its technical scope.

(1) The light blocking films 38, 138, and 238 and the reflection/transmission films 40, 140, and 240 may be made of different materials.

(2) The first transmission films 39, 139, and 239 and the second transmission films 41, 141, and 241 may be made of different materials. In this case, the refractive indexes of the first transmission film 39, 139, and 239 and the second transmission film 41, 141, and 241 may be different or may be the same.

(3) The first transmission films 39, 139, and 239 and the fifth insulating films 35, 135, and 235 may be made of different materials. Even in this case, in Embodiment 3, it is desirable that the first transmission film 239 and the fifth insulating film 235 have the same refractive index. However, this is not necessarily the case. In Embodiments 1 and 2, the first transmission films 39 and 139 and the fifth insulating films 35 and 135 may have different refractive indexes or may be the same refractive index.

(4) The light blocking films 38, 138, and 238 and the first transmission films 39, 139, and 239 may have different film thicknesses.

(5) The first transmission films 39, 139, and 239 and the second transmission films 41, 141, and 241 may have the same film thickness. Further, the film thicknesses of the second transmission films 41, 141, and 241 may be larger than the film thicknesses of the first transmission films 39, 139, and 239.

(6) The first transmission films 39, 139, and 239 and the alignment films 36 and 136 may have the same film thickness. Further, the film thicknesses of the first transmission films 39, 139, and 239 may be larger than the film thickness of the alignment films 36 and 136.

(7) The second transmission films 41, 141, and 241 and the alignment films 36 and 136 may have the same film thickness. Further, the film thicknesses of the second transmission films 41, 141, and 241 may be larger than the film thicknesses of the alignment films 36 and 136.

(8) The first transmission films 39, 139, and 239 and the fifth insulating films 35, 135, and 235 may have the same film thickness. Further, the film thicknesses of the first transmission films 39, 139, and 239 may be larger than the film thicknesses of the fifth insulating films 35, 135, and 235.

(9) The refractive indexes of the alignment films 36 and 136 may be larger than the refractive indexes of the second transmission films 41, 141, and 241.

(10) In the configurations described in Embodiments 2 and 3, the common electrodes (the third transparent electrode films) 130 and 230 and the second transmission films 141 and 241 may have the same film thickness. Further, the film thicknesses of the second transmission films 141 and 241 may be larger than the film thicknesses of the common electrodes 130 and 230.

(11) In the configurations described in Embodiments 2 and 3, the refractive indexes of the common electrodes (the third transparent electrode films) 130 and 230 may be smaller than the refractive indexes of the second transmission films 141 and 241.

(12) In the configurations described in Embodiments 2 and 3, the refractive indexes of the common electrodes (the third transparent electrode films) 130 and 230 may be the same as or may be different from the refractive indexes of the first transmission films 139 and 239.

(13) The specific materials that are used for the light blocking films 38, 138, and 238, the first transmission films 39, 139, and 239, the reflection/transmission films 40, 140, and 240, the second transmission films 41, 141, and 241, the pixel electrodes 28 and 128, the common electrodes 30, 130, and 230, the fifth insulating films 35, 135, and 235, the alignment films 36 and 136, and the like can be appropriately changed in addition to those mentioned above.

(14) The specific values of the film thicknesses and refractive indexes of the light blocking films 38, 138, and 238, the first transmission films 39, 139, and 239, the reflection/transmission films 40, 140, and 240, the second transmission films 41, 141, and 241, the pixel electrodes 28 and 128, the common electrodes 30, 130, and 230, the fifth insulating films 35, 135, and 235, the alignment films 36 and 136, and the like can be appropriately changed in addition to those mentioned above.

(15) The second transmission films 41, 141, and 241 may be provided only in the formation ranges of the light blocking parts 37, 137, and 237.

(16) It is also possible to omit the second transmission films 41, 141, and 241.

(17) Each of the light blocking parts 37, 137, and 237 may be configured only by the second light blocking part 37B extending along the Y-axis direction. Further, each of the light blocking parts 37, 137, and 237 may be configured only by the first light blocking part 37A extending along the X-axis direction.

(18) The drain electrode 27C provided in the TFT 27 may be made of the same second metal film as the source electrode 27B. In this case, the first transparent electrode film and the third insulating film 33 can be omitted.

(19) The configuration of the TFT 27 may be of a bottom gate type, a double gate type, or the like, in addition to the top gate type shown in the drawings.

(20) The arrangement order or planar arrangement in the X-axis direction of the color filters 29 on the array substrates 21, 121, and 221 can be appropriately changed in addition to those shown in the drawings. As a modification example of the planar arrangement of the color filters 29, for example, the color filters 29 exhibiting different colors may be arranged side by side in the Y-axis direction, or the color filters 29 exhibiting different colors may be arranged side by side in the X-axis direction and the Y-axis direction.

(21) The number of colors of the color filter 29 may be four or more. The additional color filter 29 may be a yellow color filter capable of emitting yellow light included in the yellow wavelength region (in a range of about 570 nm to about 600 nm), a transparent color filter capable of emitting light in the entire wavelength region, or the like.

(22) The "upper layer electrode" which is an electrode that is located on the upper layer side, of each of the pixel electrodes 28 and 128 and each of the common electrodes 30, 130, and 230, may be each of the pixel electrodes 28 and 128, and the "lower layer electrode" which is an electrode that is located on the lower layer side may be each of the common electrodes 30, 130, and 230. In this case, the light blocking parts 37, 137, and 237 are disposed on the upper layer side or the lower layer side of the pixel electrodes 28 and 128, which are "upper layer electrodes".

(23) The semiconductor film may be a silicon thin film (a polycrystalline silicon thin film) or an amorphous silicon thin film.

(24) It is also possible to omit the second semiconductor film.

(25) The alignment films 36 and 136 may be subjected to alignment treatment by rubbing.

(26) Instead of the second circuit part 14B, a source driver may be mounted on the array substrates 21, 121, and 221 by chip on glass (COG).

(27) At least one of the first circuit part 14A and the second circuit part 14B may be partially or entirely disposed in the display area AA.

(28) It is also possible to omit the circuit part 14.

(29) The material of each of the substrates 20GS and 21GS may be synthetic resin or the like, in addition to glass.

(30) The specific numerical value of the pixel density of the liquid crystal panel 11 can be changed appropriately.

(31) The display mode of the liquid crystal panel 11 may be an IPS mode or the like.

(32) The planar shape of the liquid crystal panel 11 may be a horizontally long rectangle, a vertically long rectangle, a square, a circle, a semicircle, an oval, an ellipse, a trapezoid, or the like.

(33) In addition to the liquid crystal panel 11, an organic EL display device that is a self-luminous display device may be adopted.

(34) In addition to the head-mounted display 10HMD, for example, a head-up display, a projector, or the like is also applicable as a device that enlarges and displays an image displayed on the liquid crystal panel 11 by using a lens or the like. Further, display devices that do not have an enlarged display function (TV receivers, tablet terminals, smartphones, or the like) are also applicable.

The present disclosure contains subject matter related to that disclosed in Japanese Priority Patent Application JP 2023-031520 filed in the Japan Patent Office on Mar. 2, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
a first substrate;
a second substrate opposing to the first substrate;
a first color filter that is disposed on the second substrate's side with respect to the first substrate;
a second color filter that is disposed in a same layer as the first color filter and exhibits a different color from the first color filter;
a first pixel electrode that is disposed on the second substrate's side with respect to the first color filter and disposed to overlap the first color filter;
a second pixel electrode that is disposed on the second substrate's side with respect to the second color filter and disposed to overlap the second color filter;
a common electrode that overlaps the first pixel electrode and the second pixel electrode;
an insulating film that is interposed between the common electrode and the first pixel electrode and the second pixel electrode; and
a light blocking part that is disposed, at a boundary between the first color filter and the second color filter, on the second substrate's side with respect to the first color filter and the second color filter,
wherein the light blocking part includes a light blocking film, a first transmission film that is disposed on the second substrate's side of the light blocking film, and a reflection/transmission film that is disposed on the second substrate's side of the first transmission film,
the light blocking film has a light transmittance lower than a light transmittance of the first transmission film and a light transmittance of the reflection/transmission film, the first transmission film has the light transmittance higher than the light transmittance of the reflection/transmission film, the reflection/transmission film has a light reflectance higher than a light reflectance of the first transmission film and lower than a light reflectance of the light blocking film, the first color filter, the second color filter, the first pixel electrode, the second pixel electrode, the common electrode, the insulating film, and the light blocking part are provided to the first substrate, the light blocking part is disposed between the insulating film and an upper layer electrode that is an electrode located on the second substrate's side of the first pixel electrode and the second pixel electrode or the common electrode, and the first transmission film extends beyond a formation range of the light blocking part and is disposed in contact with the insulating film beyond the formation range of the light blocking part.

2. The display device according to claim 1, wherein the reflection/transmission film has a film thickness in a range of 3 nm to 20 nm.

3. The display device according to claim 1, wherein the first transmission film has a film thickness in a range of 20 nm to 100 nm.

4. The display device according to claim 1, wherein the reflection/transmission film is made of a same material as the light blocking film and has a film thickness smaller than a film thickness of the light blocking film.

5. The display device according to claim 1, wherein the first transmission film is made of a material having a same refractive index as the insulating film.

6. The display device according to claim 1, wherein the light blocking film and the reflection/transmission film are disposed to overlap each other.

7. The display device according to claim 1, wherein the light blocking part further includes a second transmission film that is disposed on the second substrate's side with respect to the reflection/transmission film, the second transmission film extends beyond a formation range of the light blocking part and covers the upper layer electrode within and beyond the formation range of the light blocking part, and the display device further comprises an alignment film that is disposed on the second substrate's side with respect to the second transmission film.

8. A display device comprising:
a first substrate;
a second substrate opposing to the first substrate;
a first color filter that is disposed on the second substrate's side with respect to the first substrate;
a second color filter that is disposed in a same layer as the first color filter and exhibits a different color from the first color filter;
a first pixel electrode that is disposed on the second substrate's side with respect to the first color filter and disposed to overlap the first color filter;
a second pixel electrode that is disposed on the second substrate's side with respect to the second color filter and disposed to overlap the second color filter;
a common electrode that overlaps the first pixel electrode and the second pixel electrode;
an insulating film that is interposed between the common electrode and the first pixel electrode and the second pixel electrode;
a light blocking part that is disposed, at a boundary between the first color filter and the second color filter, on the second substrate's side with respect to the first color filter and the second color filter;
a liquid crystal layer that is interposed between the first substrate and the second substrate; and
an alignment film that is provided on the first substrate and has an upper surface facing the liquid crystal layer, wherein the light blocking part includes a light blocking film, a first transmission film that is disposed on the second substrate's side of the light blocking film, and a reflection/transmission film that is disposed on the second substrate's side of the first transmission film, the light blocking film has a light transmittance lower than a light transmittance of the first transmission film and a light transmittance of the reflection/transmission film, the first transmission film has the light transmittance higher than the light transmittance of the reflection/transmission film, the reflection/transmission film has a light reflectance higher than a light reflectance of the first transmission film and lower than a light reflectance of the light blocking film, the first color filter, the second color filter, the first pixel electrode, the second pixel electrode, the common electrode, the insulating film, and the light blocking part are provided to the first substrate, the light blocking part further includes a second transmission film that is disposed on the second substrate's side with respect to the reflection/transmission film, the second transmission film extends beyond a formation range of the light blocking part and covers an upper layer electrode that is an electrode located on the second substrate's side of the first pixel electrode and the second pixel electrode or the common electrode, at least beyond the formation range of the light blocking part, and the alignment film is disposed on the second substrate's side of the second transmission film.

* * * * *